US008875047B2

(12) United States Patent
Beykpour et al.

(10) Patent No.: US 8,875,047 B2
(45) Date of Patent: Oct. 28, 2014

(54) SMART DOCKING FOR WINDOWING SYSTEMS

(75) Inventors: Kayvon Beykpour, Mill Valley, CA (US); Ben Cunningham, Tallahassee, FL (US); Joseph Bernstein, Mill Valley, CA (US); Zexiao Yu, San Francisco, CA (US)

(73) Assignee: Blackboard Inc., Washington, DC (US)

( * ) Notice: Subject to any disclaimer, the term of this patent is extended or adjusted under 35 U.S.C. 154(b) by 412 days.

(21) Appl. No.: 12/873,261

(22) Filed: Aug. 31, 2010

(65) Prior Publication Data

US 2012/0054674 A1    Mar. 1, 2012

(51) Int. Cl.
*G06F 3/048*       (2013.01)
*G06F 3/0481*      (2013.01)

(52) U.S. Cl.
CPC .................................... *G06F 3/0481* (2013.01)
USPC ............................ 715/788; 715/795; 715/772

(58) Field of Classification Search
USPC .......................................... 715/788, 795, 772
See application file for complete search history.

(56) References Cited

U.S. PATENT DOCUMENTS

| 5,305,435 A * | 4/1994 | Bronson ....................... 715/777 |
| 2005/0204306 A1* | 9/2005 | Kawahara et al. ............ 715/782 |
| 2011/0010271 A1* | 1/2011 | Black et al. ................. 705/27.2 |
| 2011/0072388 A1* | 3/2011 | Merrell et al. ................ 715/784 |
| 2011/0145751 A1* | 6/2011 | Landman et al. ............. 715/781 |

OTHER PUBLICATIONS

Jason Zandri, Quick Guide to the New Aero Features in Windows 7, Aug. 17, 2009. p. 1.*

* cited by examiner

*Primary Examiner* — Andrea Leggett
(74) *Attorney, Agent, or Firm* — McDermott, Will & Emery LLP

(57) ABSTRACT

A graphical user interface system is provided. The system includes a display and a processor, coupled to the display, configured to display a window, in an initial position. Upon receiving a window docking input by a user indicating a request to dock the window at a predefined docking point, the processor is configured to dock the window at the predefined docking point. The docking of the window at the predefined docking point includes hiding a portion of the window. Upon receiving a window docking input by a user indicating a request to simultaneously dock each of a plurality of windows at a predefined docking point, the processor is configured to dock each of the plurality of windows at a corresponding position on the predefined docking point, including hiding a portion of each of the plurality of windows. Methods and computer-readable mediums are also provided.

52 Claims, 38 Drawing Sheets

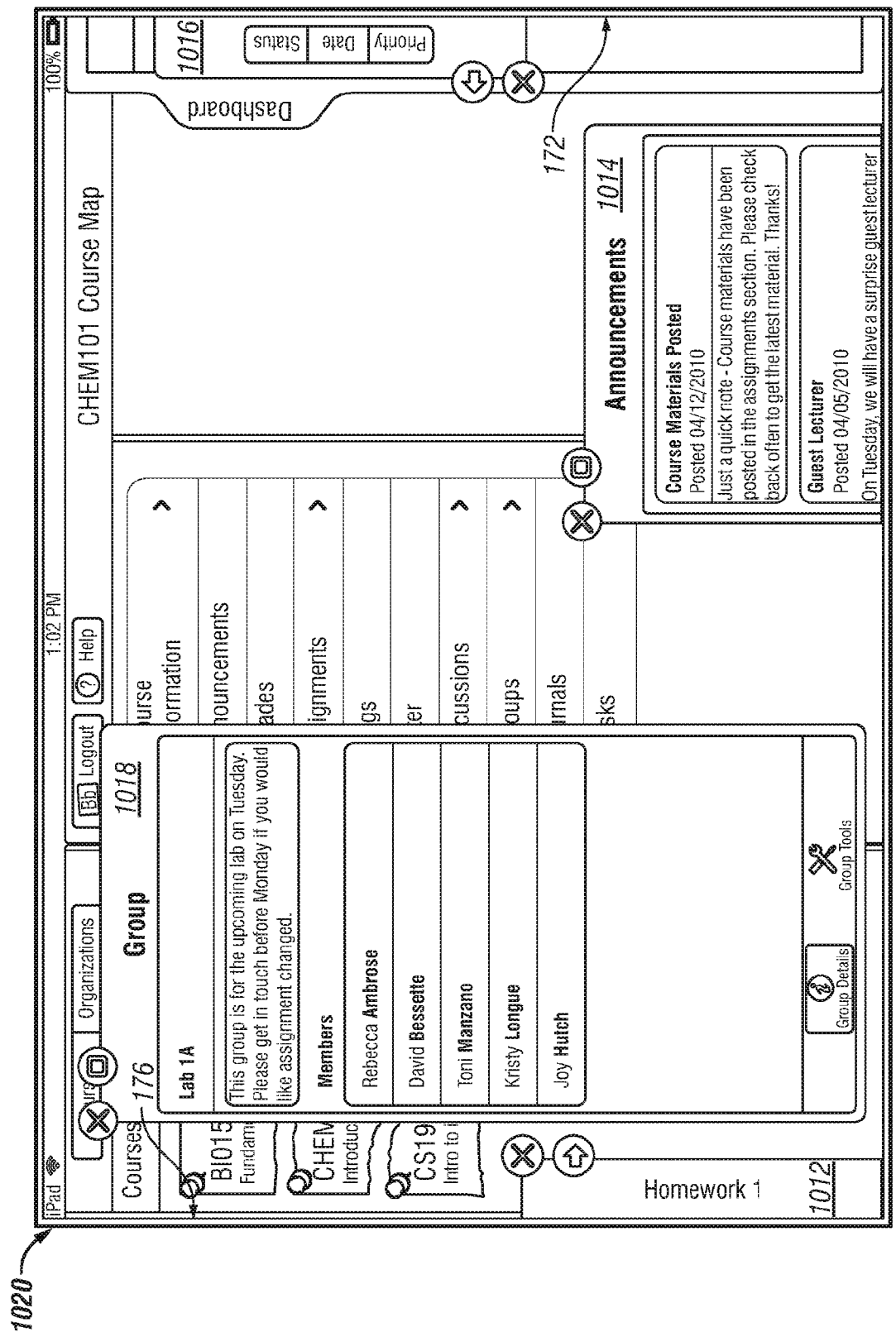

SMART DOCKING FOR WINDOWING SYSTEMS

BACKGROUND

1. Field

The present disclosure generally relates to graphical user interfaces, and more particularly to interacting with windows in a graphical user interface.

2. Description of the Related Art

It is well known to those of ordinary skill in the art to create and use graphical user interfaces on computers that use windows. Such systems are commonly referred to as windowing systems.

Windowing systems often display a task bar in a display area (e.g., on screen) that is used to launch and monitor windows. The task bar is in a predetermined location and usually on one edge of the display area. Each window may be docked or minimized to the task bar by clicking a button to remove the window from the display area (or a single button to remove all windows from the display area), after which the window is represented on the task bar with an icon and/or title of the window.

Additionally, only one window is configured to receive a user input at any given time, even if a plurality of windows are displayed in the display area. For example, if there are two windows displayed in the display area, a user can only interact with one window at any given time. A user cannot, for example, move two windows in different directions at the same time.

Furthermore, each windows may include objects that have a predetermined purpose that are not usable for other purposes. For example, a scroll bar in a window can only be used to scroll the contents of the window. As another example, in order to move a window, a user must select an object within the window or portion of the window that has the limited and predetermined purpose of moving the window.

SUMMARY

There is a problem, then, of windowing systems not allowing a user to dock a window without using a task bar, not allowing a user to select any edge of the display area to dock the window, and removing all of the contents of the window from the display area in order to dock the window. There is another problem of not allowing a user to interact with multiple windows at the same time. There is a further problem of not allowing a user to adjust a window by using objects or areas within the window that have functions other than adjusting the window.

These and other problems are addressed by the disclosed graphical user interface system, which in certain embodiments allows a user to dock a window without using a task bar, to select any edge of the display area to dock the window, and to dock the window while displaying a portion of its contents and hiding a remaining portion of its contents. Embodiments of the system also allow a user to interact with multiple windows at a time. The system further allows a user to adjust a window by using objects or areas within the window that also have a predetermined function other than for adjusting the window.

In certain embodiments, a graphical user interface system is disclosed. The system includes a display and a processor, coupled to the display, configured to display a window, in an initial position. Upon receiving a window docking input by a user indicating a request to dock the window at a predefined docking point, the processor is configured to dock the window at the predefined docking point. The docking of the window at the predefined docking point includes hiding a portion of the window.

In certain embodiments, a method for docking a window is disclosed. The method includes displaying, on a display, a window in an initial position, and docking the window at the predefined docking point in response to receiving, by a processor, a window docking input from a user indicating a request to dock the window at a predefined docking point. Docking the window at the predefined docking point includes hiding a portion of the window.

In certain embodiments, a computer-readable medium including computer-readable instructions for causing a processor to execute a method is disclosed. The method includes displaying, on a display, a window in an initial position, and receiving, by the processor, a window docking input from a user indicating a request to dock the window at a predefined docking point. The method further includes docking the window at the predefined docking point. Docking the window at the predefined docking point includes hiding a portion of the window.

In certain embodiments, a graphical user interface system is disclosed. The system includes a display, and a processor, coupled to the display, configured to display a plurality of windows, each including an initial position. Upon receiving a window docking input by a user indicating a request to simultaneously dock each of the plurality of windows at a predefined docking point, the processor is configured to dock each of the plurality of windows at a corresponding position on the predefined docking point. Docking of each of the plurality of windows on its corresponding position on the predefined docking point includes hiding a portion of each of the plurality of windows.

In certain embodiments, a method for docking windows is disclosed. The method includes displaying a plurality of windows, each including an initial position, and docking each of the plurality of windows at a corresponding position on the predefined docking point in response to receiving, by a processor, a window docking input by a user indicating a request to simultaneously dock each of the plurality of windows at a predefined docking point. Docking of each of the plurality of windows on its corresponding position on the predefined docking point includes hiding a portion of each of the plurality of windows.

In certain embodiments, a computer-readable medium including computer-readable instructions for causing a processor to execute a method is disclosed. The method includes displaying a plurality of windows, each including an initial position, and docking each of the plurality of windows at a corresponding position on the predefined docking point in response to receiving, by the processor, an all-window docking input by a user indicating a request to simultaneously dock each of the plurality of windows at a predefined docking point. Docking of each of the plurality of windows on its corresponding position on the predefined docking point includes hiding a portion of each of the plurality of windows.

In certain embodiments, a graphical user interface system is disclosed. The system includes a display and a processor, coupled to the display, configured to display a plurality of windows. The processor is configured to simultaneously receive from a user a plurality of window action inputs, each window action input of the plurality of window action inputs associated with a corresponding window of the plurality of windows, indicating a request to conduct an action with the corresponding window. Each window action input is separately provided by the user.

In certain embodiments, a method of simultaneously controlling multiple windows separately is disclosed. The method includes displaying a plurality of windows, and simultaneously receiving, by a processor from a user, a plurality of window action inputs, each window action input of the plurality of window action inputs associated with a corresponding window of the plurality of windows, each window action input indicating a request to conduct an action with the corresponding window. The method also includes conducting the action with the corresponding window. Each window action input is separately provided by the user.

In certain embodiments, a computer-readable medium including computer-readable instructions for causing a processor to execute a method is disclosed. The method includes displaying a plurality of windows, and simultaneously receiving, by the processor from a user, a plurality of window action inputs, each window action input of the plurality of window action inputs associated with a corresponding window of the plurality of windows, each window action input indicating a request to conduct an action with the corresponding window. The method also includes conducting the action with the corresponding window. Each window action input is separately provided by the user.

In certain embodiments, a graphical user interface system is disclosed. The system includes a display and a processor, coupled to the display, configured to display a window. The window includes a frame portion and a content portion including an object having at least one predetermined function and capable of receiving an input configured to active the at least one predetermined function. When the processor receives a window adjustment input for the object from a user indicating a request to adjust the window, the window is configured to be adjusted. The window adjustment input is different than the input.

In certain embodiments of the system, the processor is configured to receive the window adjust input within the frame portion of the window. In certain embodiments of the system, the predetermined function includes at least one of scrolling, zooming, rotating, and panning. In certain embodiments of the system, the window adjustment comprises at least one of moving at least a portion of the window, resizing at least a portion of the window, and zooming into or out of at least a portion of the window.

In certain embodiments, a method of adjusting a window is disclosed. The method includes displaying a window, the window including a frame portion and a content portion including an object having at least one predetermined function and capable of receiving an input configured to active the at least one predetermined function. The method also includes adjusting the window in response to receiving a window adjustment input for the object from a user indicating a request to adjust the window. The window adjustment input is different than the input.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 10A and 10B illustrate exemplary screenshots for simultaneously interacting with a plurality of windows with separate inputs, using the system of FIG. 1A.

DETAILED DESCRIPTION

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail so as not to obscure the disclosure.

Figure 1A:
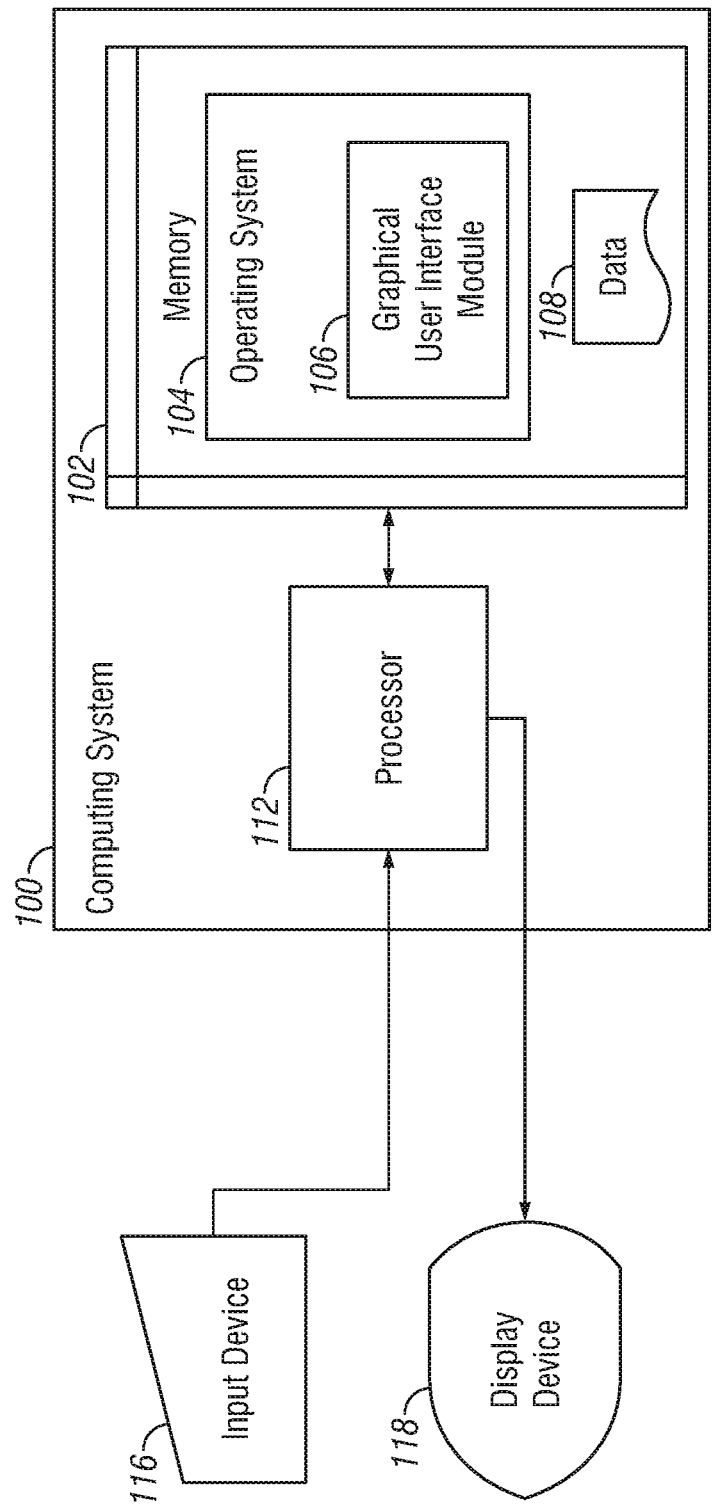
FIG. 1A illustrates a graphical user interface computing system according to certain embodiments of the disclosure.

FIG. 1A illustrates a graphical user interface computing system 100 according to certain embodiments of the disclosure. The system 100 includes a processor 112 coupled to a display device 118. In certain embodiments, the processor 112 is coupled to an input device 116. In certain embodiments, the system 100 includes memory 102 that includes an operating system 104 having a graphical user interface module 106.

The processor 112 is configured to execute instructions. The instructions can be physically coded into the processor 112 ("hard coded"), received from software, such as the graphical user interface module 106, stored in memory 102, or a combination of both. In certain embodiments, the graphical user interface module 106 is associated with the functionality of displaying windows on the display device 118 for the system 100 running an operating system 104. As one example, and without limitation, the computing system 100 is an Apple® iPad®, the processor 112 is an 1 GHz Apple® A4 processor, and the input device 116 and display device 118 are jointly a touch screen liquid crystal display (LCD).

Other exemplary computing systems 100 include laptop computers, desktop computers, tablet computers, servers, clients, thin clients, personal digital assistants (PDA), portable computing devices, mobile intelligent devices (MID) (e.g., a smartphone), software as a service (SAAS), or suitable devices with a processor 112 and a memory 102. The system 100 can be stationary or mobile. The system 100 may also be managed by a host, such as over a network. In certain embodiments, the system 100 is wired or wirelessly connected to the network via a communications module via a modem connection, a local-area network (LAN) connection including the Ethernet, or a broadband wide-area network (WAN) connection, such as a digital subscriber line (DSL), cable, T1, T3, fiber optic, or satellite connection. Other exemplary input devices 116 include mice and keyboards. Other exemplary display devices 118 include organic light emitting diodes (OLED) and cathode ray tubes (CRT).

Figure 1B:
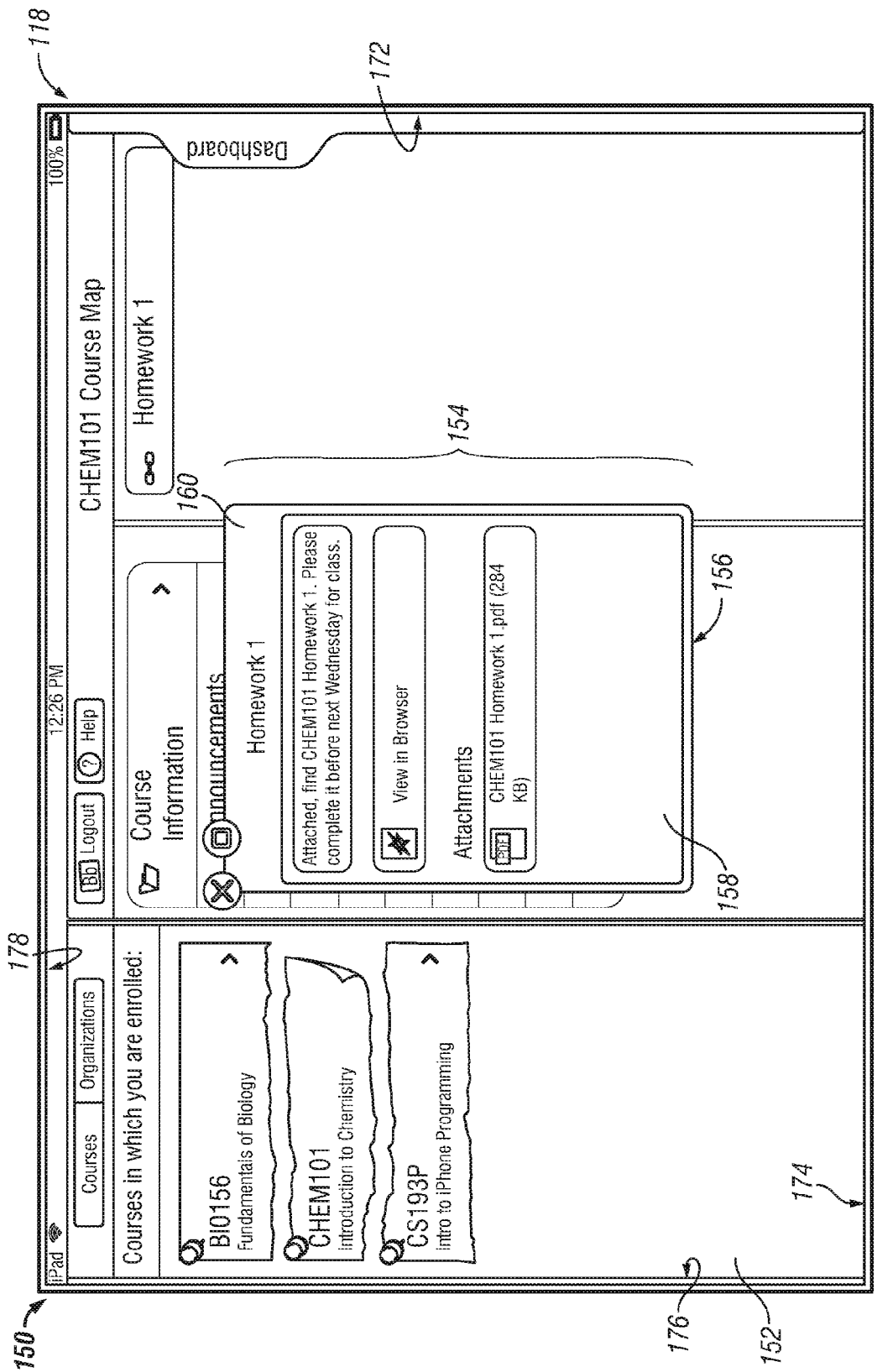
FIG. 1B illustrates an exemplary screenshot from the system of FIG. 1A.

FIG. 1B is an exemplary screenshot 150 from the display device 118 of system 100. The screenshot 150 represents the displayable area 150 of the display device 118. The displayable area 150 includes a desktop 152 and at least one window 154 appearing above the desktop 152. As discussed herein, the displayable area 150 is the area represented by a screenshot. Accordingly, the terms displayable area and screenshot, and their associated reference numbers, are used interchangeably. As discussed herein, a window 154 is a visual area displayed by a display device 118 that includes a user interface that displays the output of one or many processes. In certain embodiments, the window 154 displays the input of one or many processes. A window 154 may have any shape, including but not limited to, a rectangle or other polygon, circle, or triangle. A window 154 often includes a display that is different from the rest of the display area 150. In certain embodiments, a window 154 includes at least two distinct parts: a frame portion 156 and a content portion 158. The frame portion includes a title portion 160, such as a title bar. The displayable area 150 also includes a plurality of predefined docking points 172, 174, 176, and 178. A predefined docking point can be designated as any place within the displayable area 150 of a display device 118. For example, a predefined docking point can be the top edge 178 of the displayable area, the right edge 172 of the displayable area, the bottom edge of the displayable area 174, or the left edge of the displayable area 176. In certain embodiments not illustrated, the predefined docking point can appears somewhere else within the displayable area 150, such as in the center of the displayable area 150.

As will be discussed in further detail below with reference to other appropriate exemplary screenshots, in certain embodiments, the processor 112 is a means for and is configured to display a window 154 in an initial position on the display device 118. Upon receiving a window docking input, such as via input device 116, by a user indicating a request to dock the window at a predefined docking point 172, 174, 176, or 178, the processor is configured to dock the window at the predefined docking point 172, 174, 176, or 178, wherein the docking of the window 154 at the predefined docking point 172, 174, 176, or 178 includes hiding a portion of the window. In certain embodiments, the content portion 158 of the window 154 is hidden. In certain embodiments, the processor 112 is a means for and is configured to display a plurality of windows 154, each comprising an initial position, and, upon receiving a window docking input by a user indicating a request to simultaneously dock each of the plurality of windows 154 at a predefined docking point, the processor 112 is configured to dock each of the plurality of windows 154 at a corresponding position on the predefined docking point 172, 174, 176, or 178, wherein the docking of each of the plurality of windows on its corresponding position on the predefined docking point 172, 174, 176, or 178 includes hiding a portion of each of the plurality of windows 172, 174, 176, or 178. In certain embodiments, the processor 112 is a means for and is configured to display a plurality of windows, simultaneously receive from a user a plurality of window action inputs, each window action input of the plurality of window action inputs associated with a corresponding window of the plurality of windows, indicating a request to conduct an action with the corresponding window, wherein each window action input is separately provided by the user. In certain embodiments, the processor 112 is a means for and is configured to display a window 154 that includes a frame portion 156 and a content portion 158 including an object having at least one predetermined function and capable of receiving an input configured to active the at least one predetermined function. When the processor 112 receives a window adjustment input for the object from a user indicating a request to adjust the window 154, the window 154 is configured to be adjusted. The window adjustment input is different than the input.

Figure 2A:
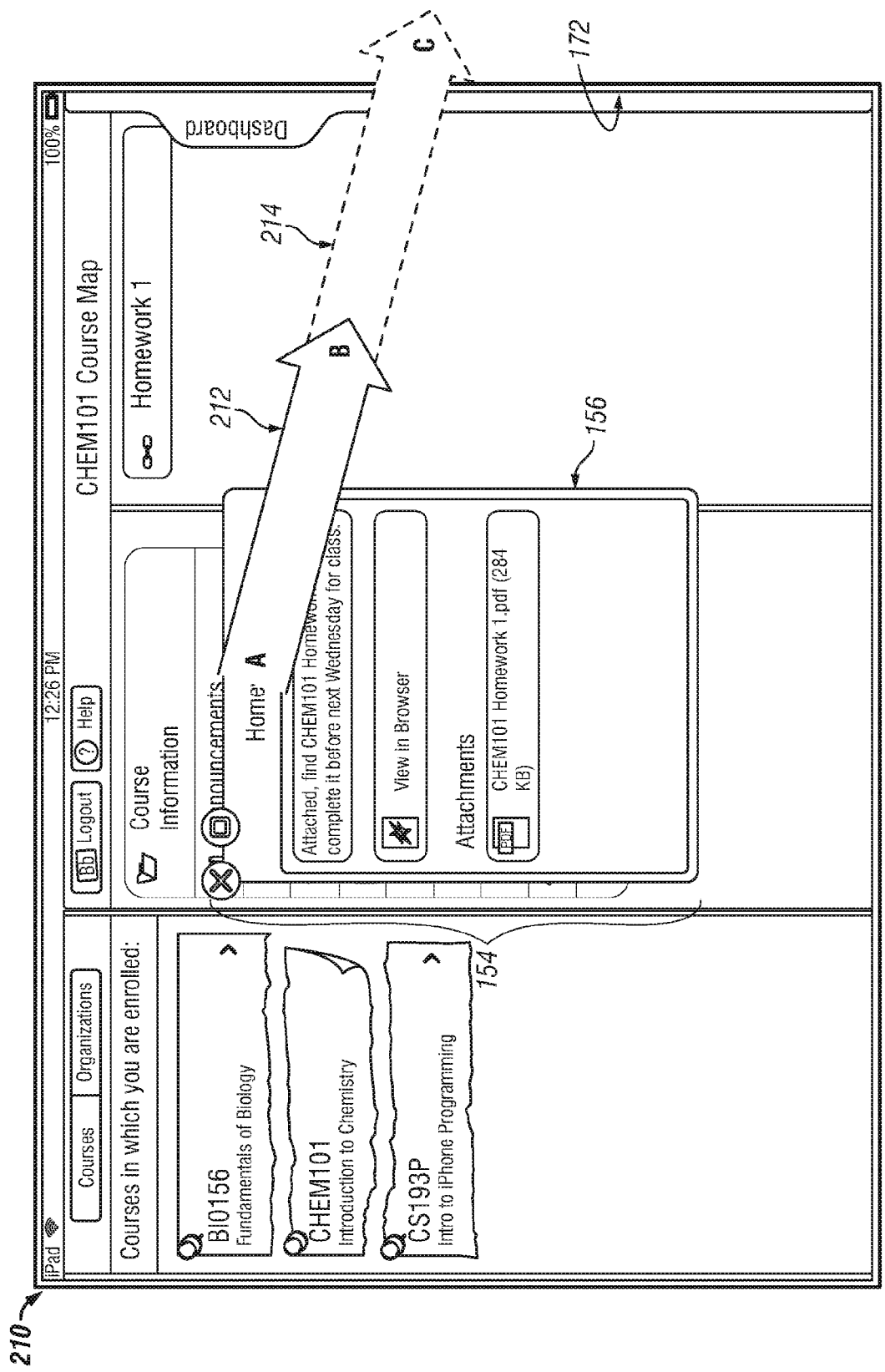
FIGS. 2A-2C illustrate exemplary screenshots for docking a window to a right edge of a display area using the system of FIG. 1A.
Figure 2B:
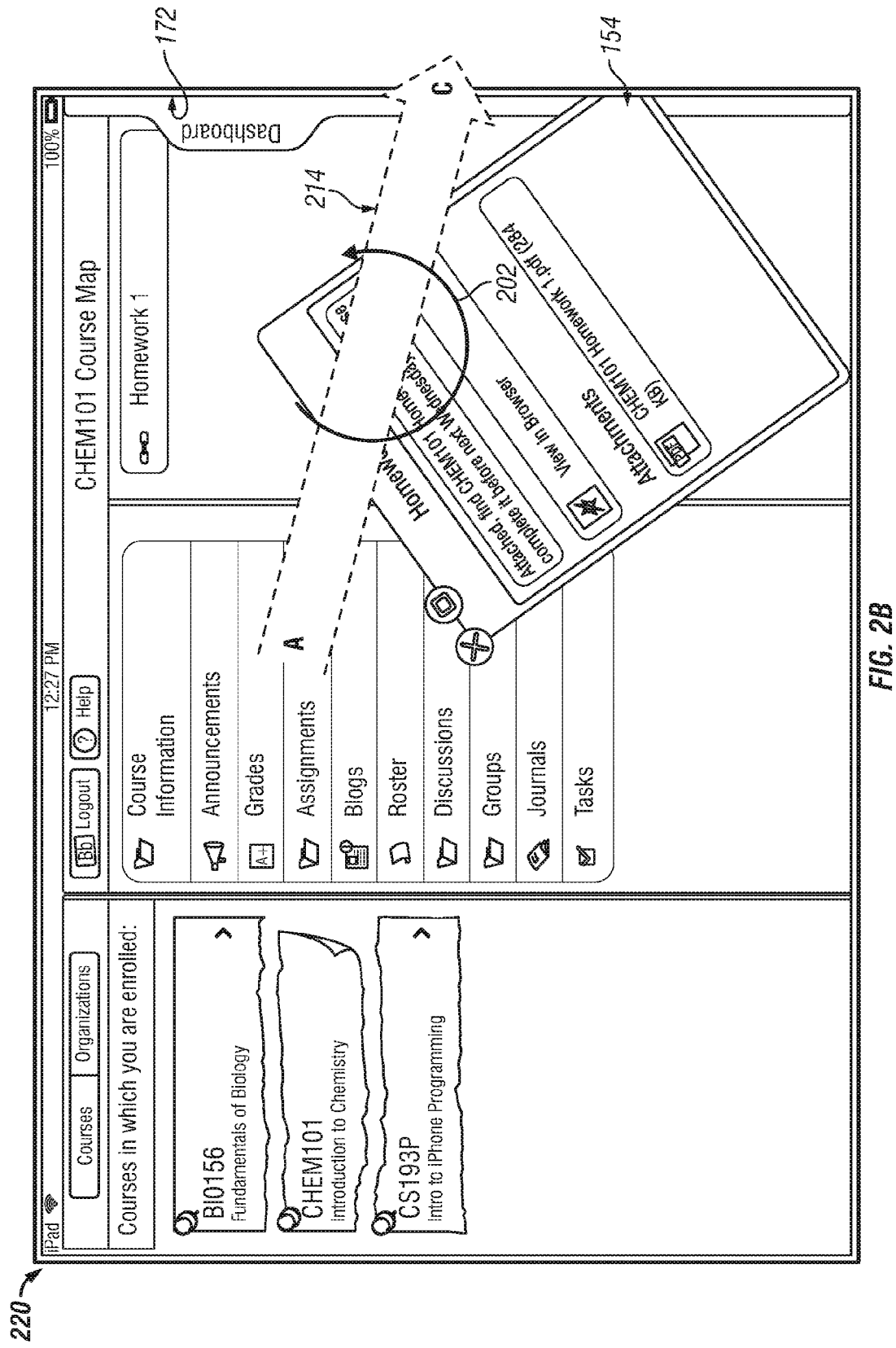
Figure 2C:
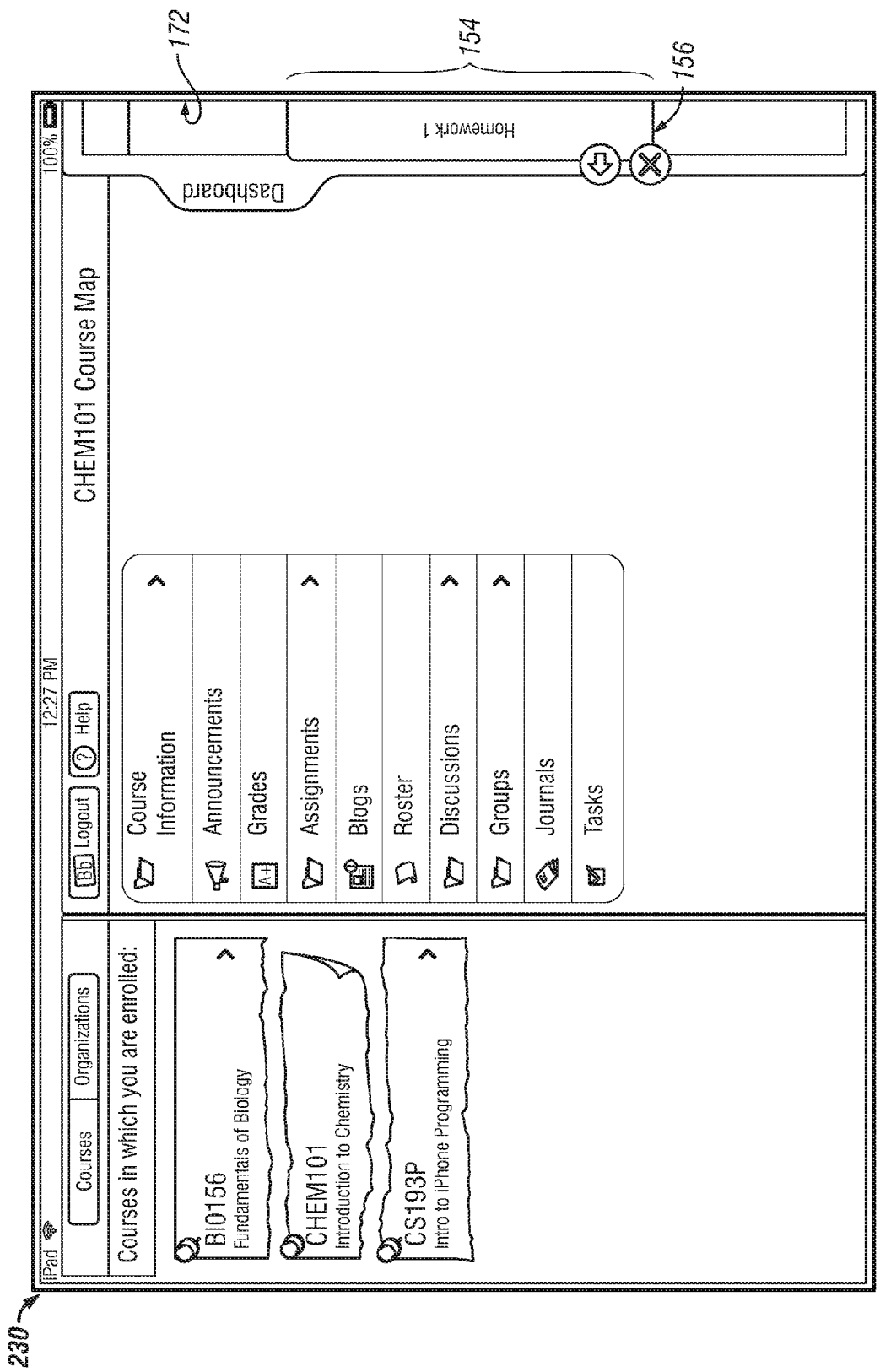

FIGS. 2A-2C illustrate exemplary screenshots 210, 220, and 230 in docking a window 154 to a right edge 172 of a display area using the system 100 of FIG. 1A. FIG. 2A illustrates an exemplary screenshot 210 with a window 154 displayed in an initial position. A window docking input is received from a user indicating a request to dock the window 154 at a predefined docking point 172. Vector 212 represents the distance and direction of actual movement of the window 154 by a user, and vector 214 represents the distance and direction of projected movement of the window 154 and final location C of window 154 based on the velocity of movement of the window 154 from point A to point B of vector 212, e.g., based on the speed at which the window 154 was dragged from point A to point B of vector 212. For example, a user via a touch screen input device 116 provides a haptic input, e.g., presses on the display area with his finger corresponding to point A (i.e., within the frame portion 156 of window 154), and drags window 154 using his finger from point A to point B along vector 212 in the direction of a predefined docking point, the right edge 172 of the display area. The window 154 is dragged at a velocity that, upon the user removing his finger from the display area at point B, the window 154 is projected, based on the velocity, to end at point C of vector 214, beyond the displayable area (or "screen") 210. The system 100, having determined based on the velocity that the projected end point of window 154 (i.e., point C of vector 214) is beyond the displayable area, determines that the user's input is a window docking input to dock the window 154 at the right edge 172 of the display area. In certain embodiments, a user's input is determined to be a window docking input based on whether point C of vector 214 is located at a point where any portion of window 154 cannot be displayed (e.g., beyond the displayable area 210). In certain embodiments, a user's input is determined to be a window docking input based on whether the distance between points A and B of vector 212, and/or points A and C of vector 214, are equal to or greater than a predefined distance. In certain embodiments, the window docking input is provided within any portion of the window 154, such as the content portion 158.

In certain embodiments, the user may use a mouse as the input device 116 and click and hold a mouse button at point A, drag the window 154 from point A to point B of vector 212, and release the mouse button at point B, thereby releasing the window 154, but the window 154 may continue to move along vector 214 towards endpoint C based on the velocity of the movement of the window between points A and B of vector 212. Other types of inputs may be employed by the user in addition to a touch screen and mouse, such as a keyboard, trackball, eye tracking, or other suitable inputs. As discussed herein with reference to the drawings, point A in a vector indicates the starting point of an input (e.g., where a window begins moving from, i.e., the point at which a user begins "holding" a window for movement), point B in a vector indicates the end point of the input (e.g., the point at which the user "releases" the window), and point C in a vector indicates the end point at which the object selected by the input is projected to stop moving (e.g., the end point at which the window is projected to stop moving) based on the velocity of movement between points A and B.

FIG. 2B illustrates an exemplary screenshot 220 after the user of FIG. 2A has released the window 154 at point B of vector 212. The window 154 continues to move along the path projected by vector 214 towards end point C of vector 214 beyond the right edge 172 of the displayable area 210. The window 154 rotates in a counterclockwise direction 202 along vector 214 while moving towards the predefined docking point 172. In certain embodiments, the window 154 does not rotate while moving towards the predefined docking point 172. In certain embodiments, the window 154 rotates in a clockwise direction along vector 214 while moving towards the predefined docking point 172.

FIG. 2C illustrates an exemplary screenshot 230 of the window 154 of FIG. 2A after it has been docked at a predefined docking point, the right edge 172 of the displayable area 230. The window 154 is docked at the predefined docking point 172 in a position corresponding to where the vector 214 of FIG. 2B intersected with the predefined docking point, the right edge 172 of the displayable area 230. The docking of the window 154 at the predefined docking point 172 hides a portion of the window. In certain embodiments, the content portion 158 of the window 154 is hidden, in this case, beyond the displayable portion of the right edge 172 of the display area 230. Hiding a portion of a window 154 is different than minimizing a window because when a window 154 is minimized, the window 154 disappears, and an icon or text usually appears in its place on a task bar in a predefined position. Hiding a portion of a window 154 allows the remaining portion of the window 154 to be displayed. The displayed portion of the window 154 includes the frame portion 156 of the window 154, which allows the title portion 160 of the window 154 to be displayed. The text "Homework 1" of title portion 160 of the window 154 is displayed from bottom to top, but in certain embodiments, the text of the title portion 160 of the window 154 is rotated, such as in accordance with the preferences of the user, or to read in the appropriate direction of the language of the text, e.g., from left to right for English. In certain embodiments, the window 154 is movable at or along the predefined docking point 172 by dragging the frame portion 156 of the window 154.

Although not illustrated, if at least one other window was docked at the predefined docking point, the right edge 172 of the displayable area 230, and the position corresponding to where the vector 214 of FIG. 2B intersected with the predefined docking point 172 were to dock a window 154 such that its displayable portion (e.g., title portion 160) was to be obscured by the other window, or the window 154 were to obscure the displayable portion (e.g., title portion) of the other window, then the other window would be moved along the predefined docking point (e.g., up or down along the right edge 172 of the display area 230) in order to appropriately display the displayable portion of the window 154.

Figure 2D:
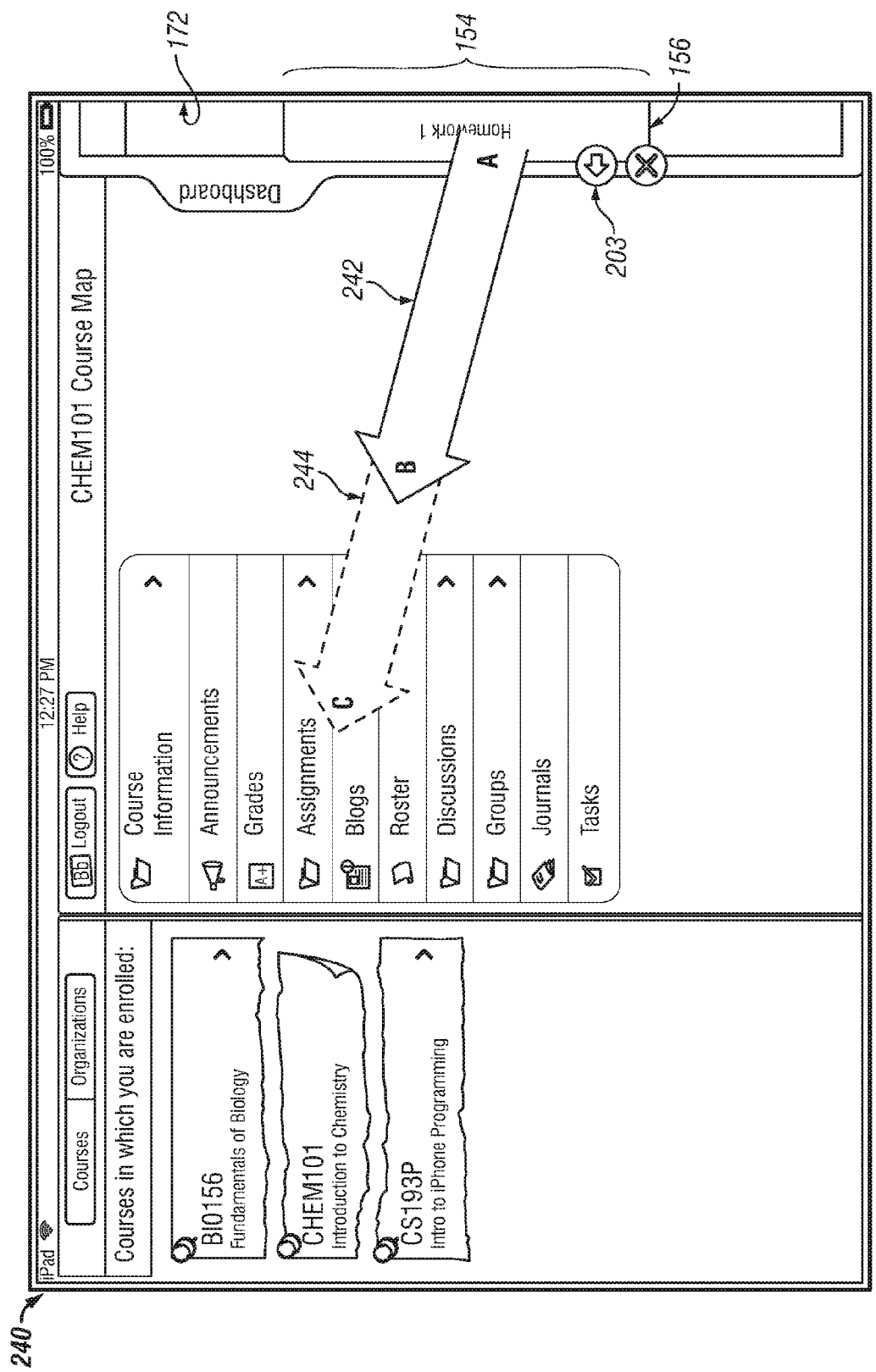
FIGS. 2D-2F illustrate exemplary screenshots for undocking the window of FIGS. 2A-2C from the right edge of the display area.
Figure 2E:
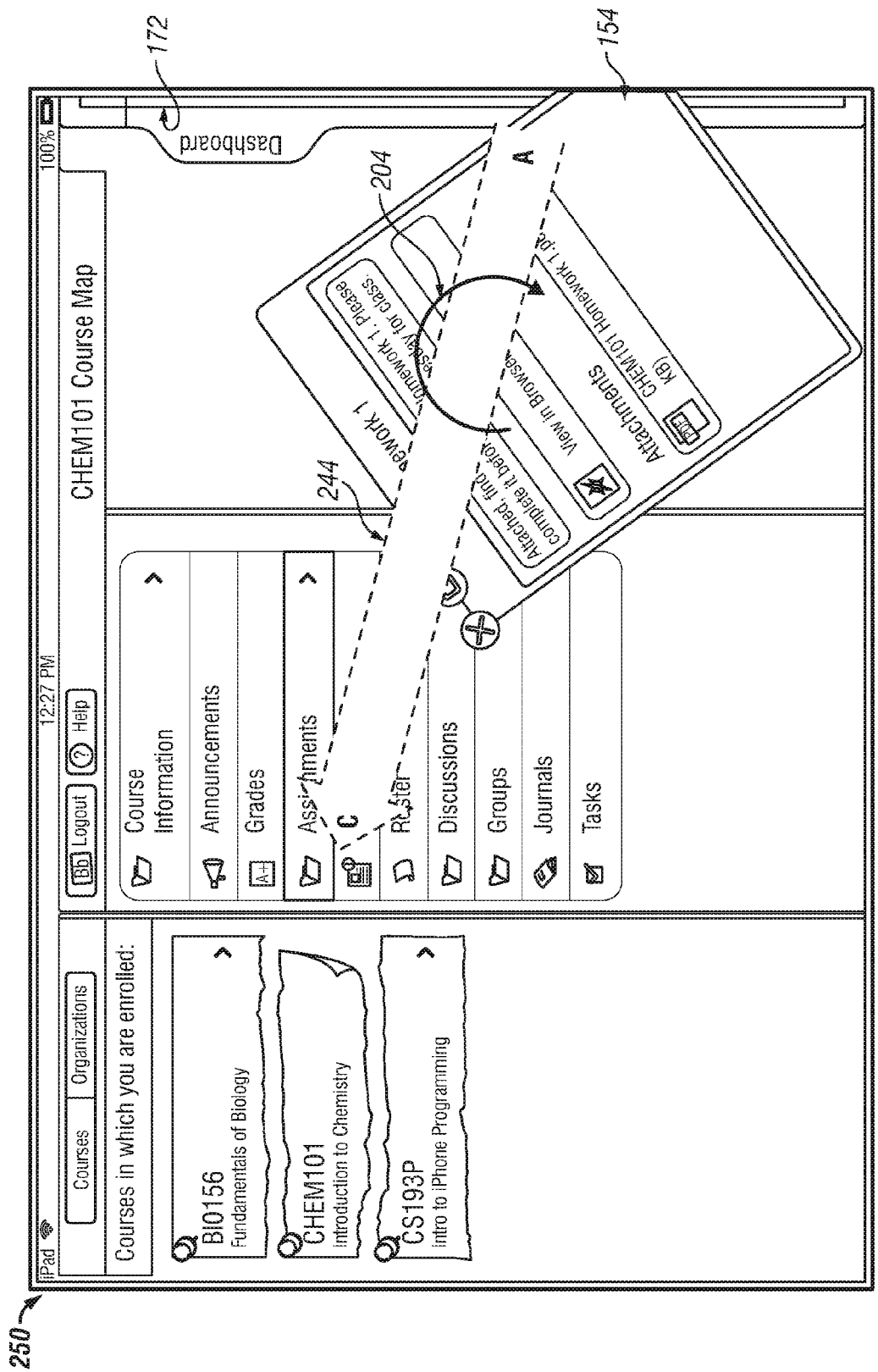
Figure 2F:
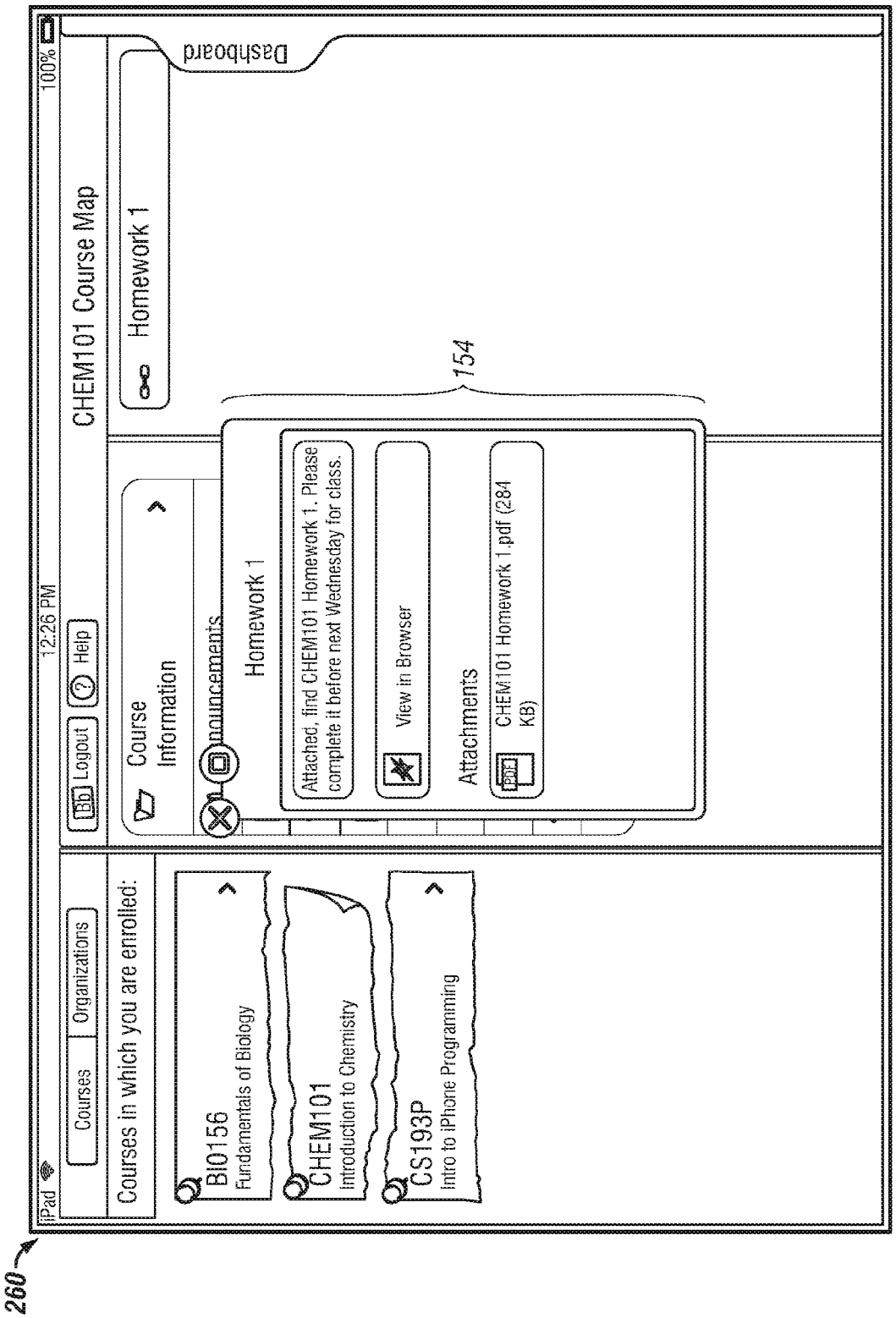

FIGS. 2D-2F illustrate exemplary screenshots 240, 250, and 260 for undocking the window 154 of FIGS. 2A-2C from the right edge 172 of the display area. FIG. 2D illustrates two options for providing a window undocking input that indicates a request to undock the window 154 from the predefined docking point 172 to return the window 154 to its initial position.

One option to undock the window 154 from the predefined docking point 172 is to activate the undocking button 203 that appears on the window 154 once it is docked. The undocking button 203 can be activated by, for example, providing a haptic input at the location of the undocking button 203 on a touch screen display or by clicking on the undocking button 203 using the mouse pointer of a mouse.

Another option to undock the window 154 from the predefined docking point 172 is to select and hold a displayable portion of the window 154 (e.g., the frame portion 156) to drag the window 154 from point A at the predefined docking point 172 to point B of vector 242 such that the window 154 is projected to have a final destination (e.g., based on the velocity of the window movement between points A and B of vector 242) of point C of vector 244. In certain embodiments, a user's input is determined to be a window undocking input based on whether the distance between points A and B of vector 242, and/or points A and C of vector 244, are equal to or greater than a predefined distance. In certain embodiments, the window 154 is undocked and returned to its initial position (see FIG. 2A) regardless of the direction of vectors 242 and/or 244. In certain embodiments, the window 154 is undocked to a position based on the direction of vectors 242 and/or 244.

FIG. 2E illustrates an exemplary screenshot 250 after the user of FIG. 2D has released the window 154 at point B of vector 242. The window 154 continues to move along the path projected by vector 244 towards end point C of vector 244. The window 154 rotates in a clockwise direction 204 (i.e., the direction opposite to the direction in which it rotated as it docked) along vector 214 while moving towards its initial position.

FIG. 2F illustrates an exemplary screenshot 260 of the window 154 of FIG. 2D after it has returned to its initial position (of FIG. 2A).

Figure 3A:
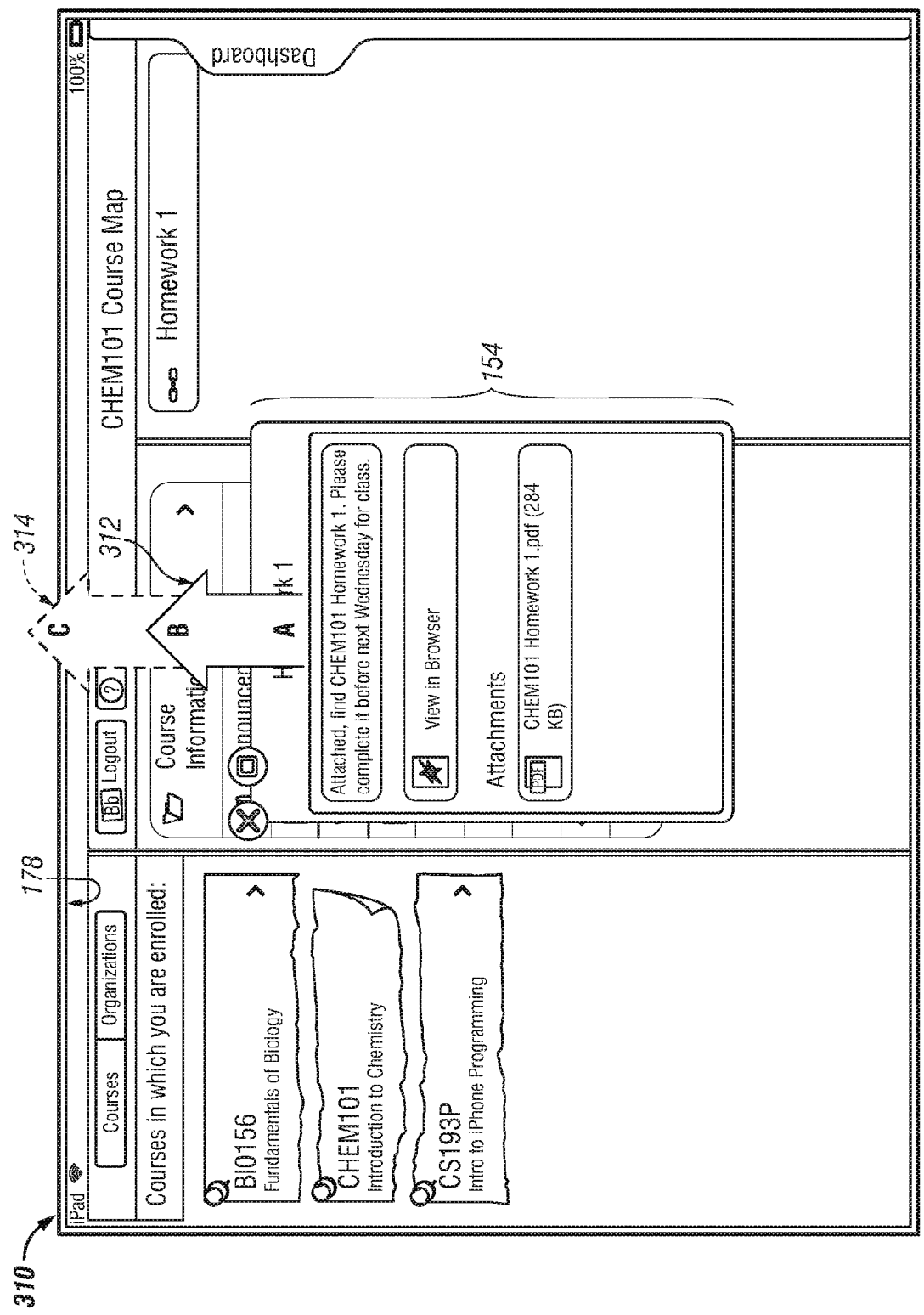
FIGS. 3A-3C illustrate exemplary screenshots for docking a window to a top edge of a display area using the system of FIG. 1A.
Figure 3B:
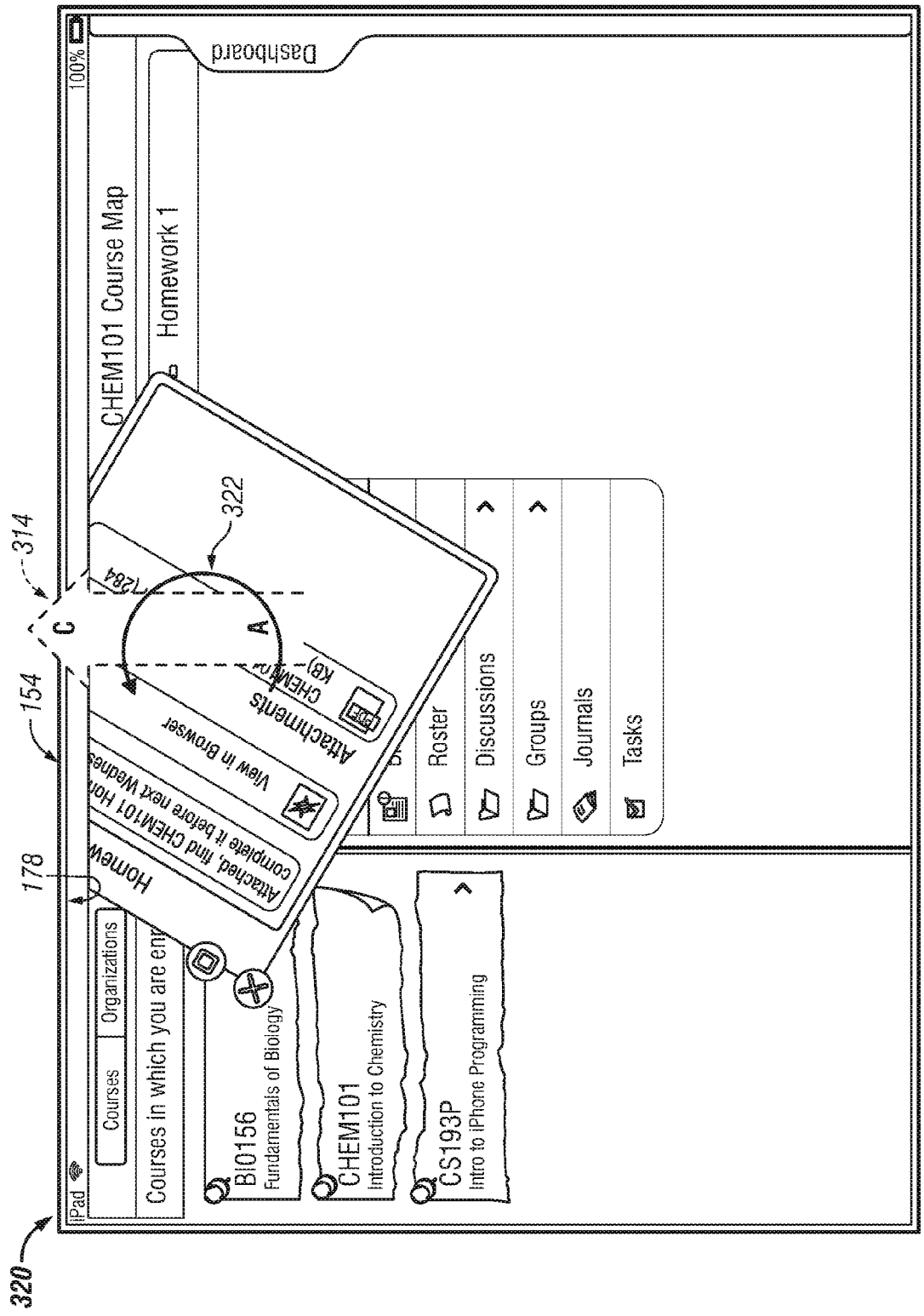
Figure 3C:
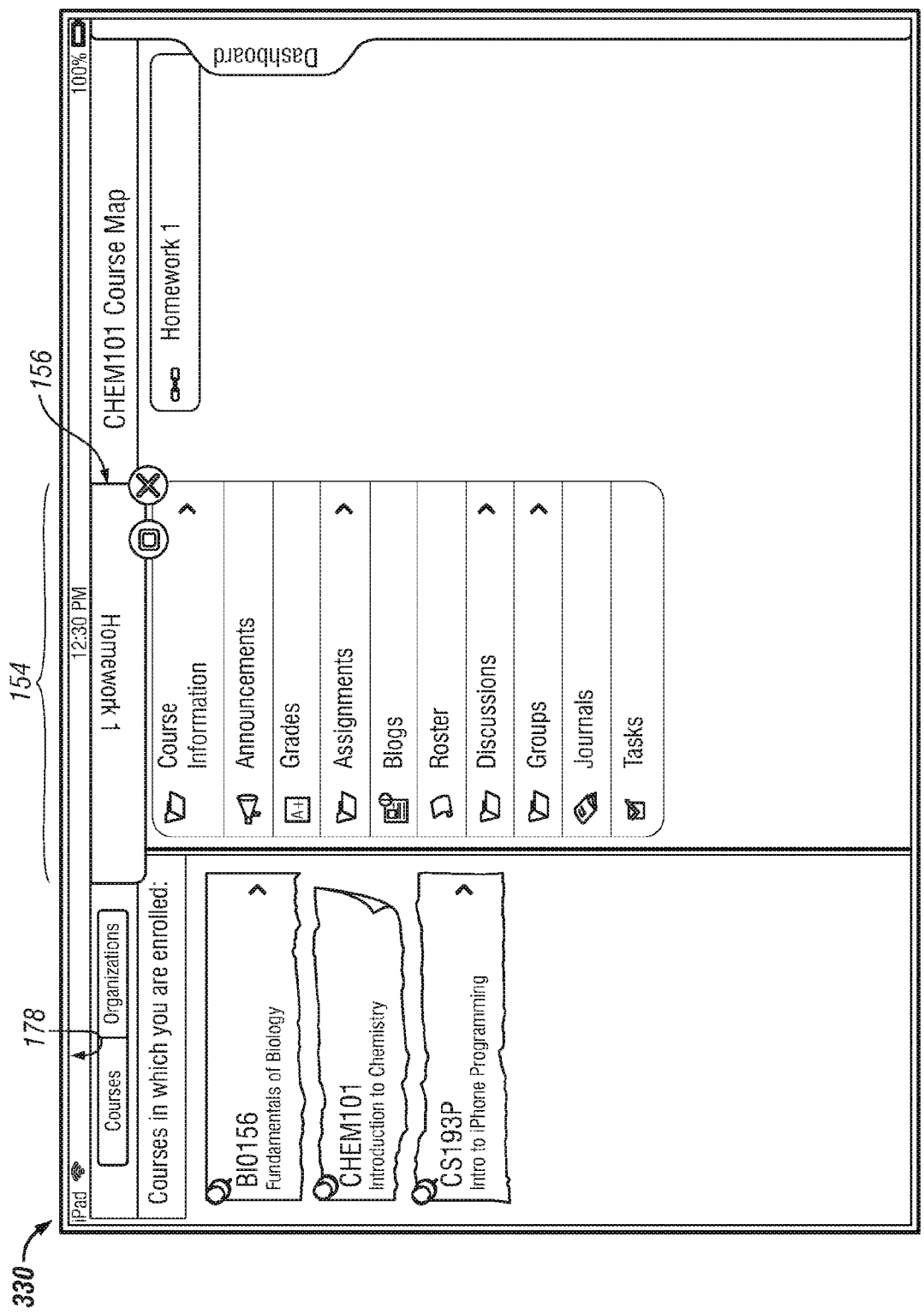

FIGS. 3A-3C illustrate exemplary screenshots 310, 320, and 330 for docking a window 154 to a top edge 178 of a display area using the system 100 of FIG. 1A. FIG. 3A illustrates an exemplary screenshot 310 with a window 154 displayed in an initial position. A window docking input is received from a user indicating a request to dock the window 154 at a predefined docking point 178, the top edge 178 of the displayable area. The window docking input includes the user selecting and holding (e.g., via an input device) a portion of the window 154 (e.g., the frame portion 156) and dragging the window 154 from point A to point B of vector 312 such that the window 154 is projected to have a final destination (e.g., based on the velocity of the window movement between points A and B of vector 312) of point C of vector 314, which is beyond the displayable area of the screenshot 310.

FIG. 3B illustrates an exemplary screenshot 320 after the user of FIG. 3A has released the window 154 at point B of vector 312. The window 154 continues to move along the path projected by vector 314 towards end point C of vector 314 beyond the top edge 178 of the displayable area on the screenshot 320. The window 154 rotates in a counterclockwise direction 322 along vector 314 while moving towards the predefined docking point 178.

FIG. 3C illustrates an exemplary screenshot 330 of the window 154 of FIG. 3A after it has been docked at a predefined docking point, the top edge 178 of the displayable area 330. The window 154 is docked at the predefined docking point 178 in a position corresponding to where the vector 314 of FIG. 3B intersected with the predefined docking point, the top edge 178 of the displayable area 330. The docking of the window 154 at the predefined docking point 178 hides the content portion 158 of the window 154 beyond the displayable portion of the top edge 178 of the display area 330. The displayed portion of the window 154 includes the frame portion 156 of the window, which allows the title portion 160 of the window 154 to be displayed.

Figure 4A:
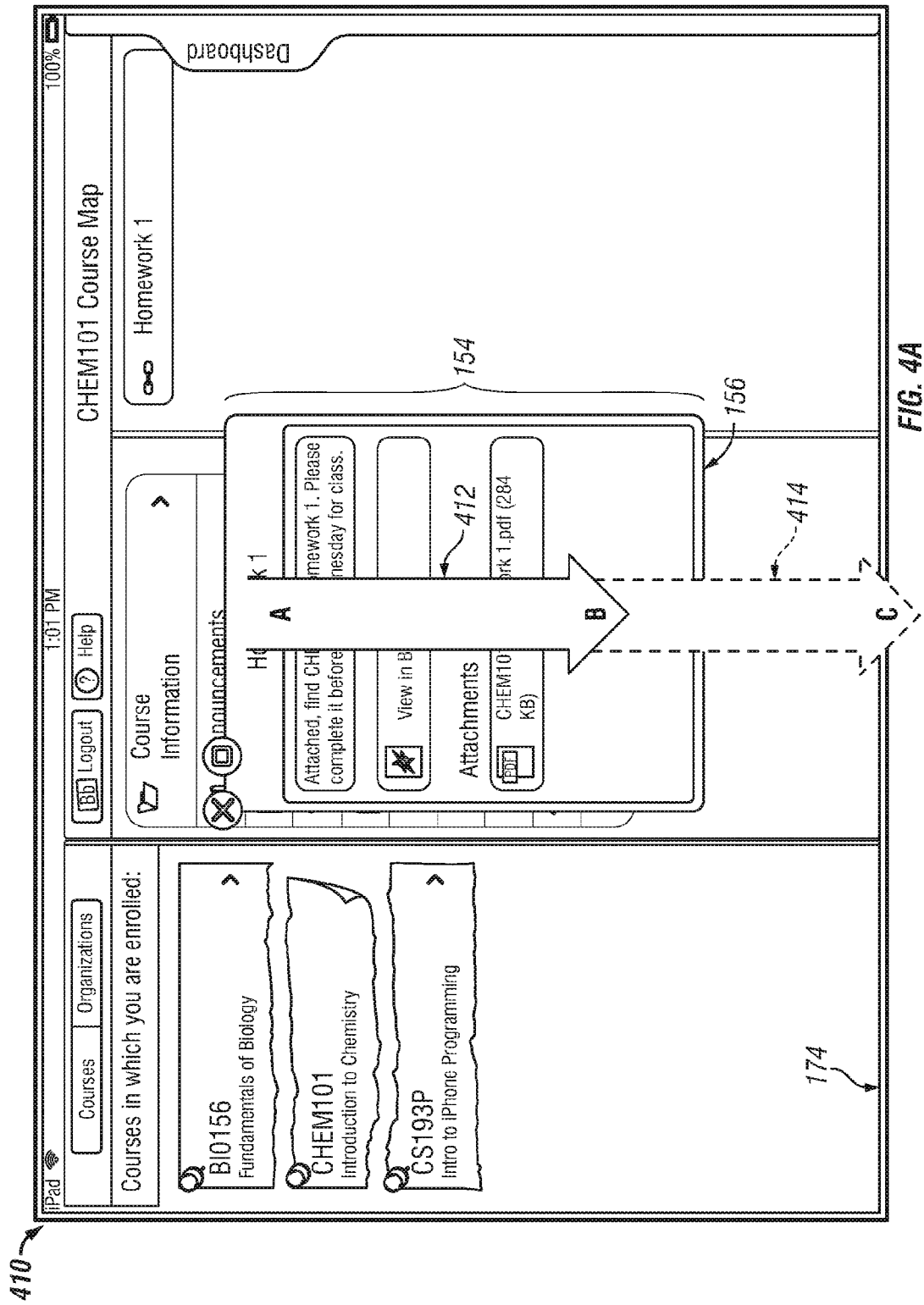
FIGS. 4A-4C illustrate exemplary screenshots for docking a window to a bottom edge of a display area using the system of FIG. 1A.
Figure 4B:
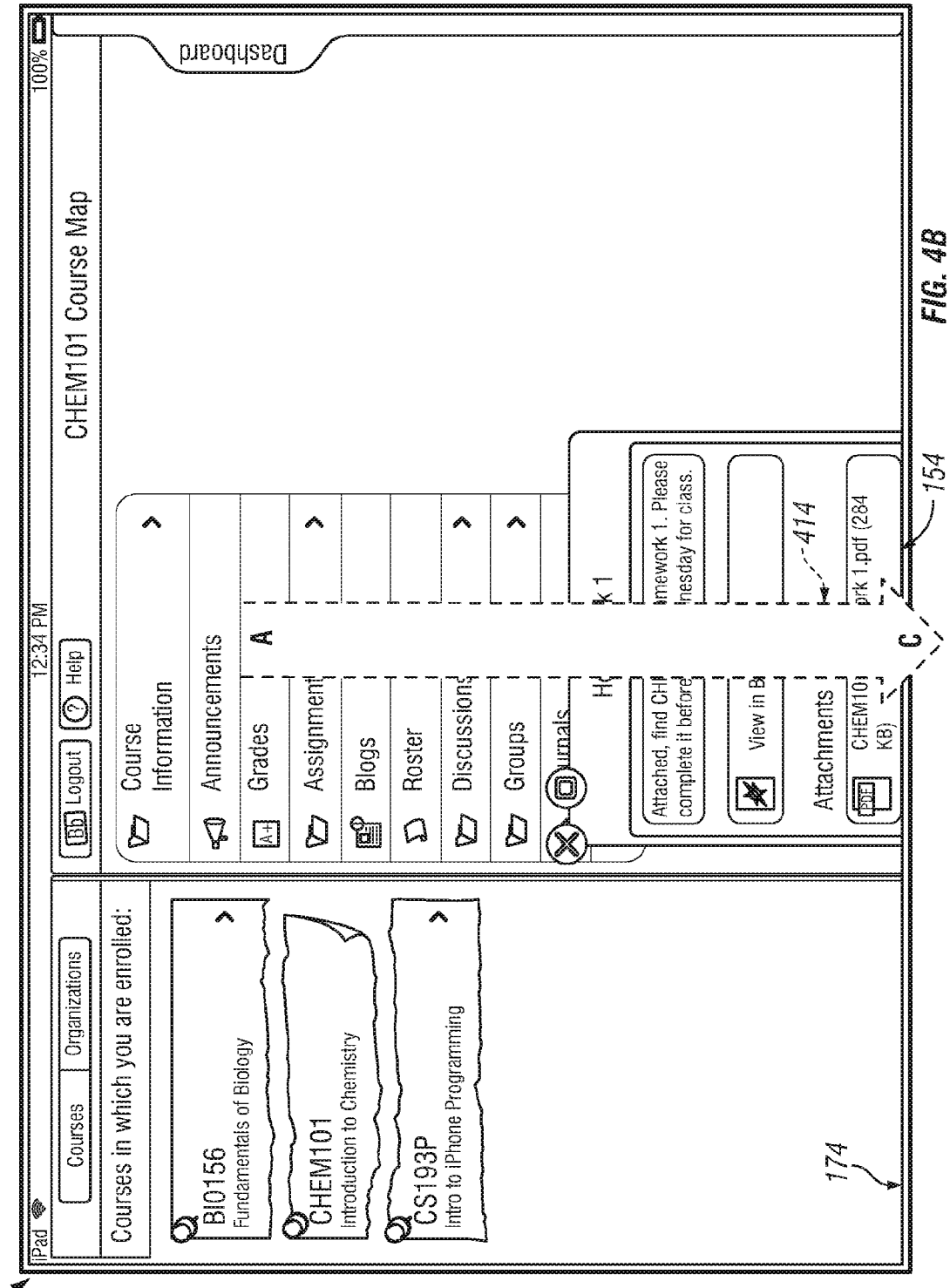
Figure 4C:
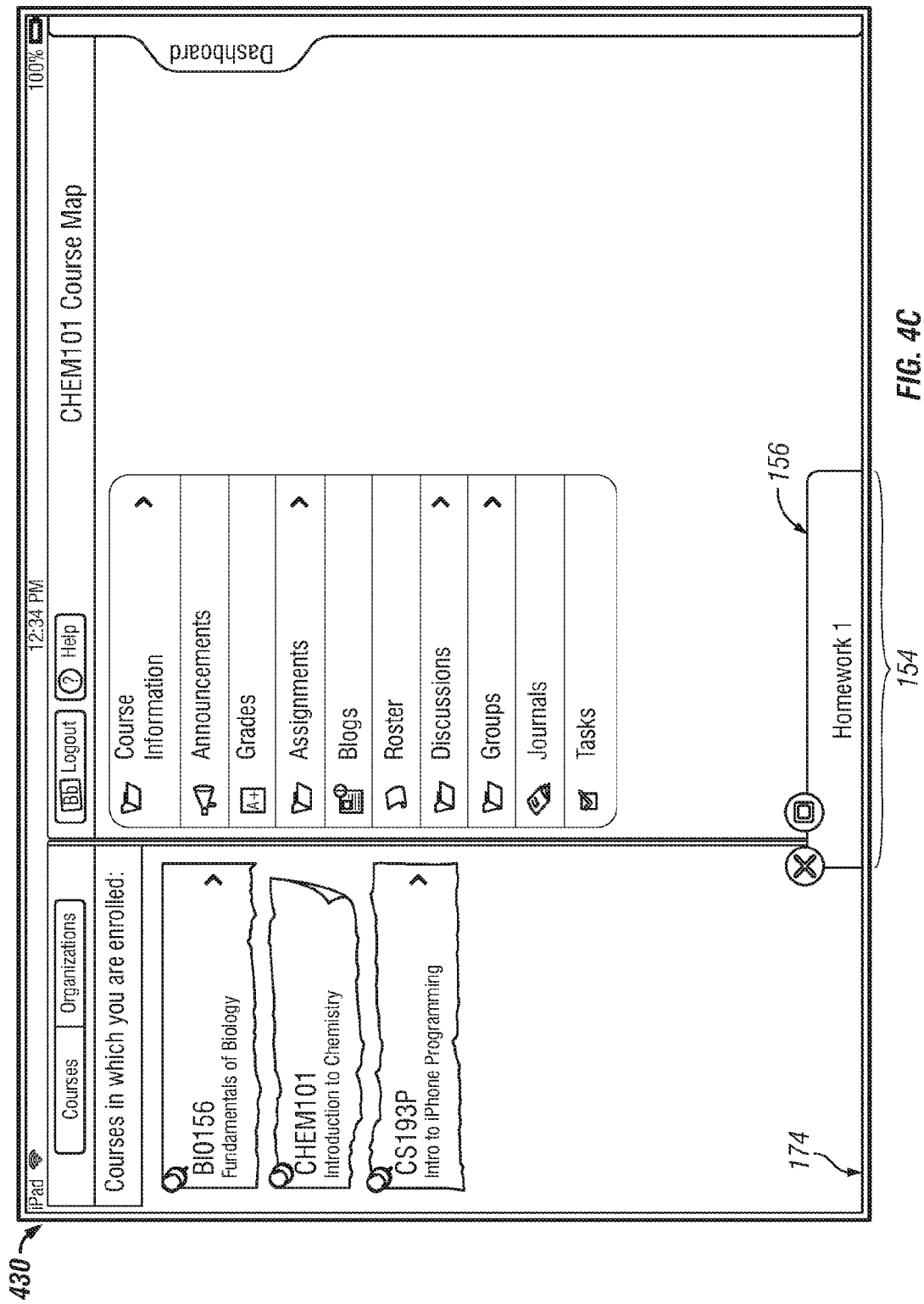

FIGS. 4A-4C illustrate exemplary screenshots 410, 420, and 430 for docking a window 154 to a bottom edge 174 of a display area using the system 100 of FIG. 1A. FIG. 4A illustrates an exemplary screenshot 410 with a window 154 displayed in an initial position. A window docking input is received from a user indicating a request to dock the window 154 at a predefined docking point 174, the bottom edge 174 of the displayable area. The window docking input includes the user selecting and holding (e.g., via an input device) a portion of the window 154 (e.g., the frame portion 156) and dragging the window 154 from point A to point B of vector 412 such that the window 154 is projected to have a final destination (e.g., based on the velocity of the window movement between points A and B of vector 412) of point C of vector 414, which is beyond the displayable area of the screenshot 410.

FIG. 4B illustrates an exemplary screenshot 420 after the user of FIG. 4A has released the window 154 at point B of vector 412. The window 154 continues to move along the path projected by vector 414 towards end point C of vector 414 beyond the bottom edge 174 of the displayable area on the screenshot 420.

FIG. 4C illustrates an exemplary screenshot 430 of the window 154 of FIG. 4A after it has been docked at a predefined docking point, the bottom edge 174 of the displayable area 430. The window 154 is docked at the predefined docking point 174 in a position corresponding to where the vector 414 of FIG. 4B intersected with the predefined docking point, the bottom edge 174 of the displayable area 430. The docking of the window 154 at the predefined docking point 174 hides the content portion 158 of the window 154 beyond the displayable portion of the bottom edge 174 of the display area 430. The displayed portion of the window 154 includes the frame portion 156 of the window, which allows the title portion 160 of the window 154 to be displayed.

Figure 5A:
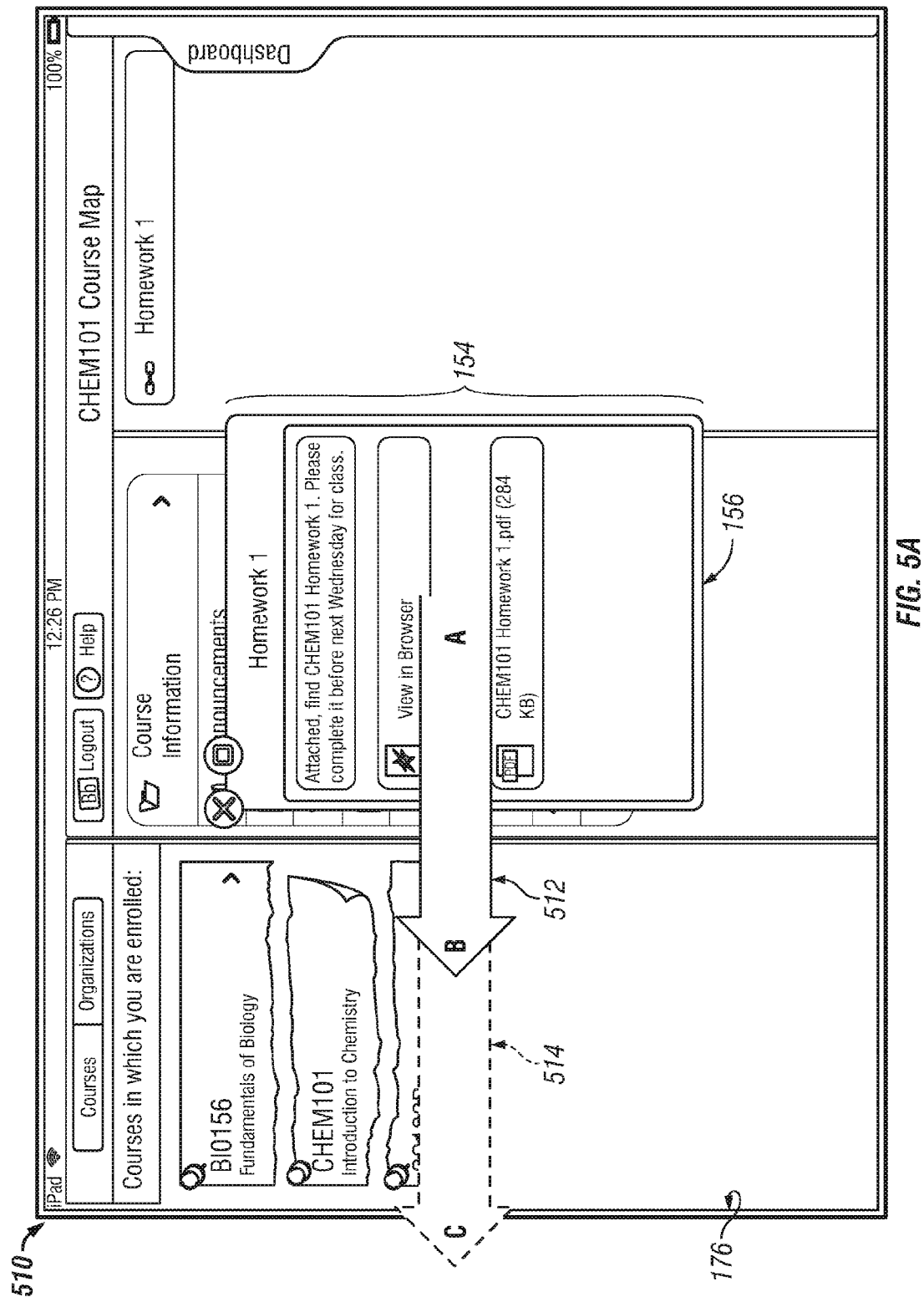
FIGS. 5A-5C illustrate exemplary screenshots for docking a window to a left edge of a display area using the system of FIG. 1A.
Figure 5B:
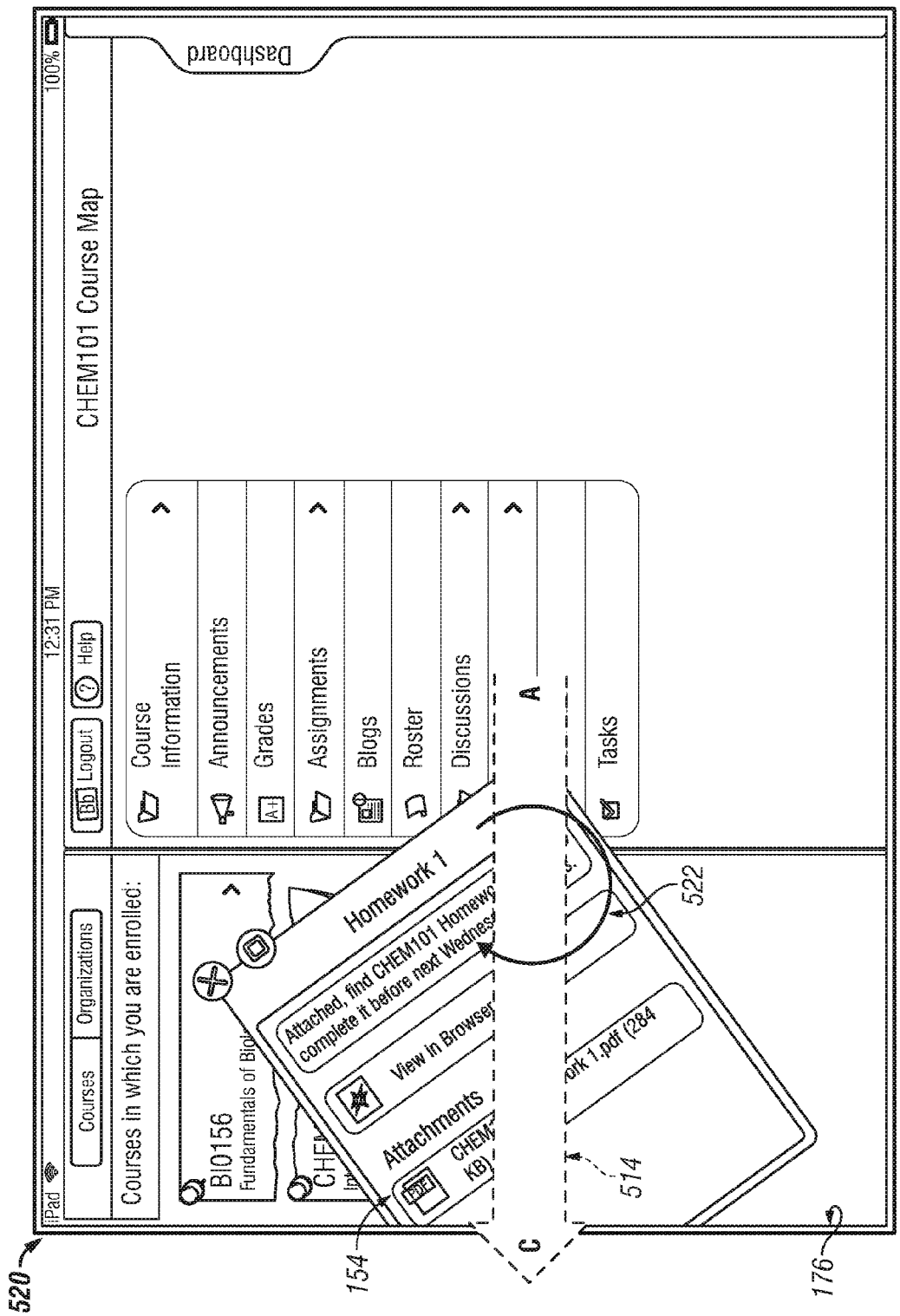
Figure 5C:
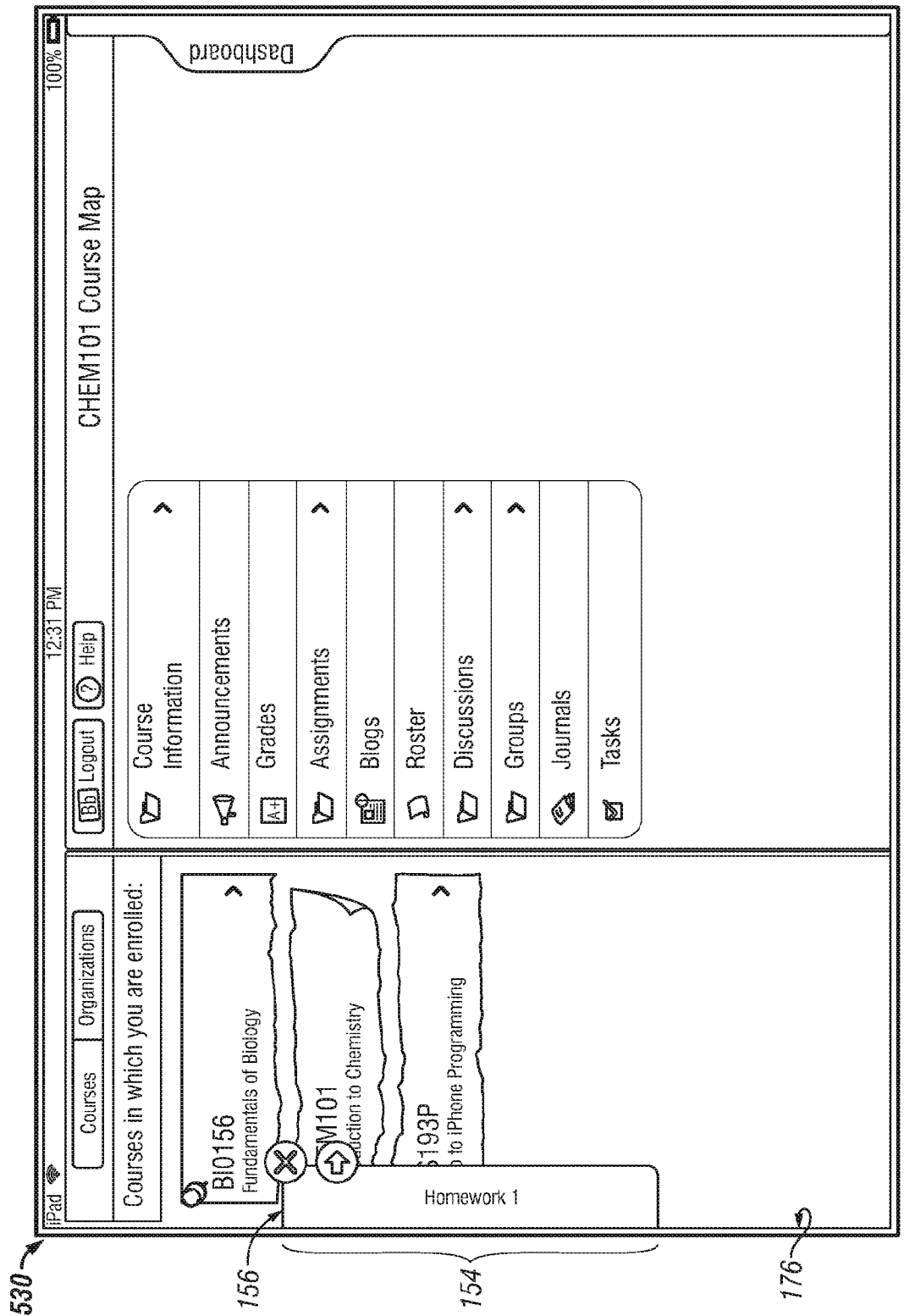

FIGS. 5A-5C illustrate exemplary screenshots 510, 520, and 530 for docking a window 154 to a left edge 176 of a display area using the system 100 of FIG. 1A. FIG. 5A illustrates an exemplary screenshot 510 with a window 154 displayed in an initial position. A window docking input is received from a user indicating a request to dock the window 154 at a predefined docking point 176, the left edge 176 of the displayable area. The window docking input includes the user selecting and holding (e.g., via an input device) a portion of the window 154 (e.g., the frame portion 156) and dragging the window 154 from point A to point B of vector 512 such that the window 154 is projected to have a final destination (e.g., based on the velocity of the window movement between points A and B of vector 512) of point C of vector 514, which is beyond the displayable area of the screenshot 510.

FIG. 5B illustrates an exemplary screenshot 520 after the user of FIG. 5A has released the window 154 at point B of vector 512. The window 154 continues to move along the path projected by vector 514 towards end point C of vector 514 beyond the left edge 176 of the displayable area on the screenshot 520. The window 154 rotates in a clockwise direction 522 along vector 514 while moving towards the predefined docking point 178.

FIG. 5C illustrates an exemplary screenshot 530 of the window 154 of FIG. 5A after it has been docked at a predefined docking point, the left edge 176 of the displayable area 530. The window 154 is docked at the predefined docking point 176 in a position corresponding to where the vector 514 of FIG. 5B intersected with the predefined docking point, the left edge 176 of the displayable area 530. The docking of the window 154 at the predefined docking point 176 hides the content portion 158 of the window 154 beyond the displayable portion of the left edge 176 of the display area 530. The displayed portion of the window 154 includes the frame portion 156 of the window, which allows the title portion 160 of the window 154 to be displayed.

Figure 6A:
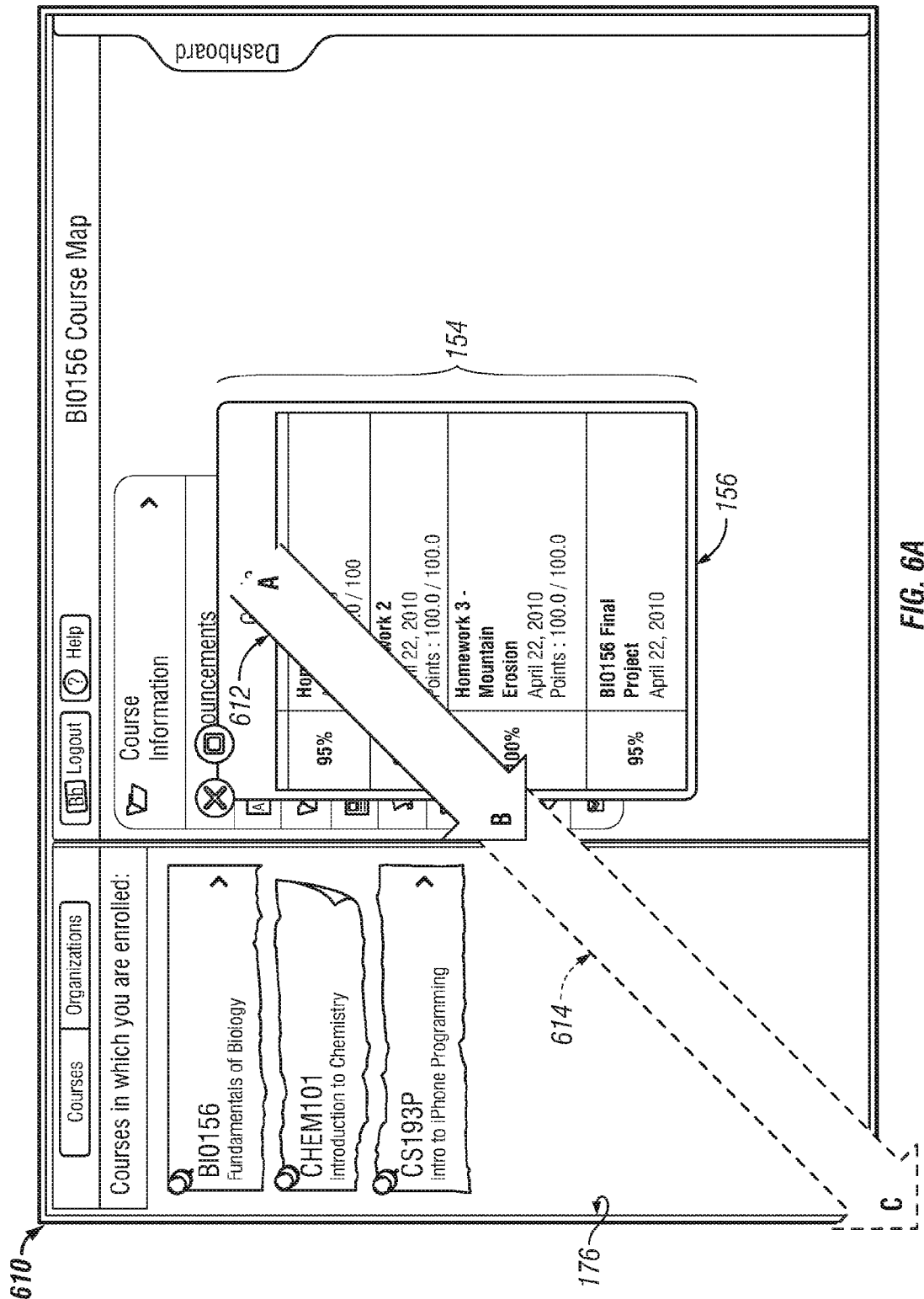
FIGS. 6A-6C illustrate exemplary screenshots for docking a window to a corner of an edge of a display area using the system of FIG. 1A.
Figure 6B:
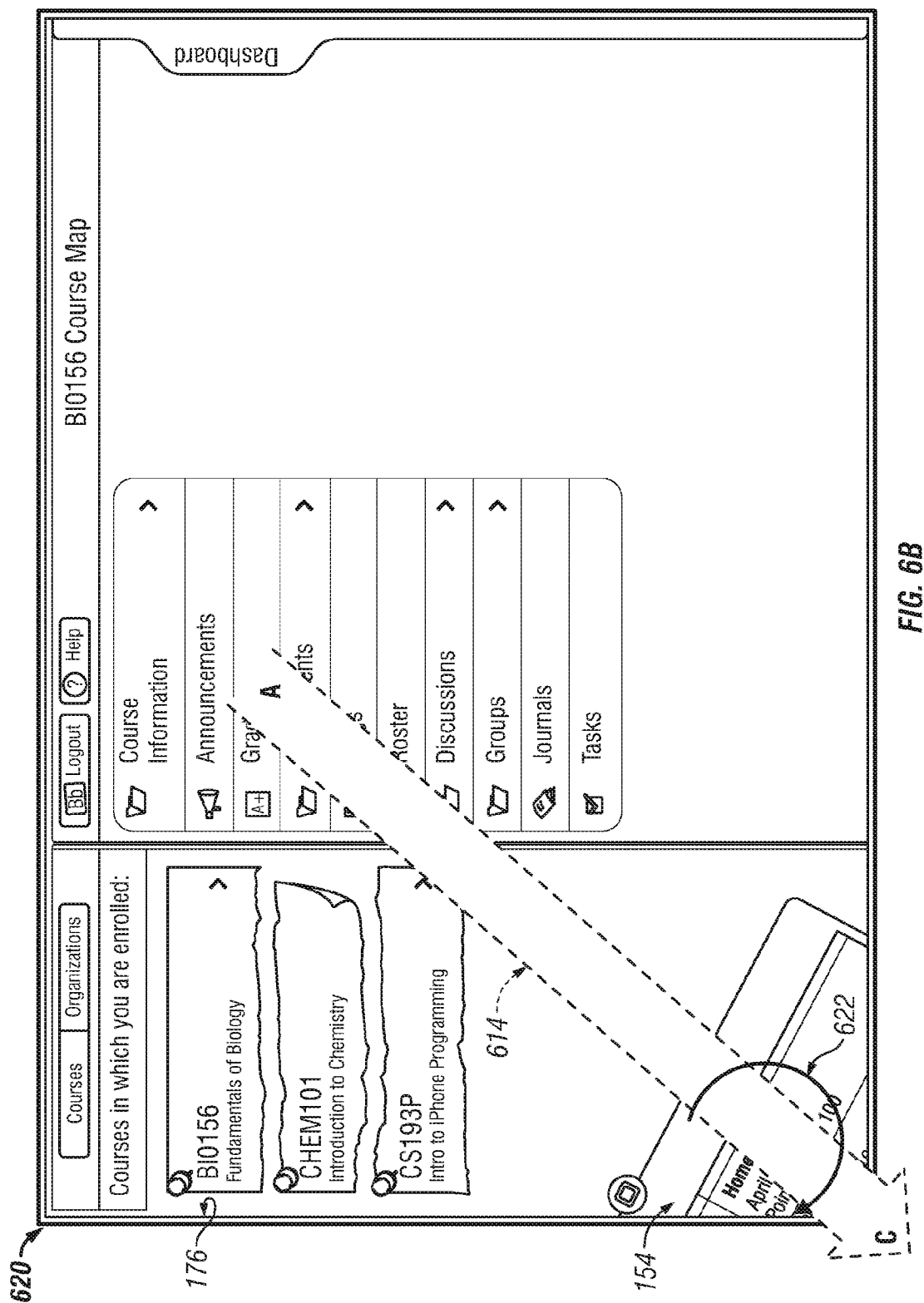
Figure 6C:
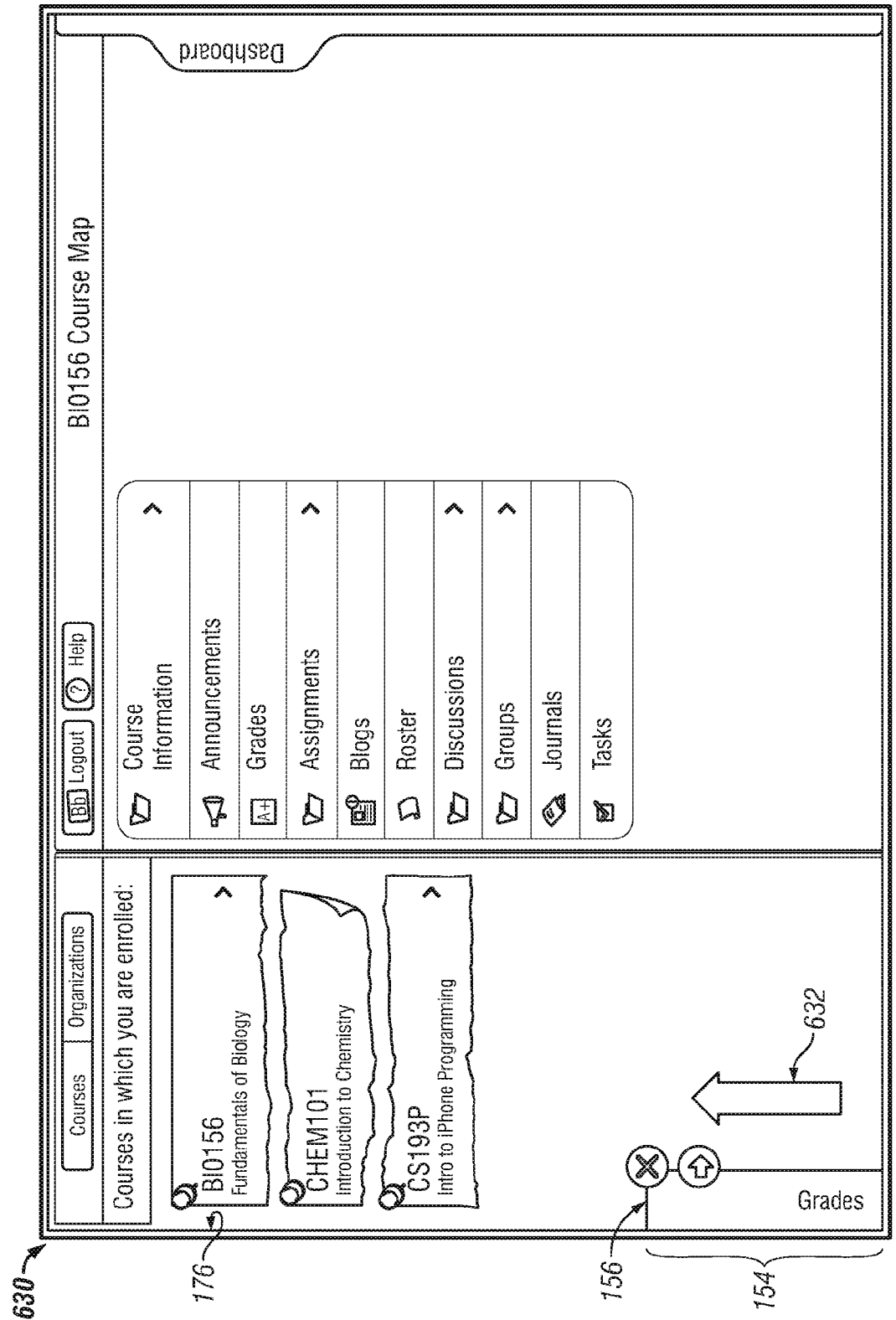

FIGS. 6A-6C illustrate exemplary screenshots 610, 620, and 630 for docking a window 154 to a corner edge of a display area using the system of FIG. 1A. FIG. 6A illustrates an exemplary screenshot 610 with a window 154 displayed in an initial position. A window docking input is received from a user indicating a request to dock the window 154 towards the bottom of a predefined docking point 176, the left edge 176 of the displayable area. The window docking input includes the user selecting and holding (e.g., via an input device) a portion of the window 154 (e.g., the frame portion 156) and dragging the window 154 from point A to point B of vector 612 such that the window 154 is projected to have a final destination (e.g., based on the velocity of the window movement between points A and B of vector 612) of point C of vector 614, which is beyond the displayable area of the screenshot 610.

FIG. 6B illustrates an exemplary screenshot 620 after the user of FIG. 6A has released the window 154 at point B of vector 612. The window 154 continues to move along the path projected by vector 614 towards end point C of vector 614 beyond the bottom end of the left edge 176 of the displayable area on the screenshot 620. The window 154 rotates in a clockwise direction 622 along vector 614 while moving towards the predefined docking point 178.

FIG. 6C illustrates an exemplary screenshot 630 of the window 154 of FIG. 6A after it has been docked at a predefined docking point, the left edge 176 of the displayable area 630. The system 100 determines that if the window 154 were docked at the predefined docking point 176 in a position corresponding to where the vector 614 of FIG. 6B intersected with the predefined docking point, the left edge 176 of the displayable area 630, then little, if any, of the frame portion 156 of the window 154 would be displayed on the displayable area of the screenshot 630. Accordingly, the window 154 is moved up (from the position corresponding to where the vector 614 of FIG. 6B intersected with the left edge 176) in the direction of arrow 632 along the left edge 176 until a predetermined amount of the frame portion 156 of the window 154 is displayed. In certain embodiments, the window 154 is moved up along the left edge 176 before it is docked to the left edge 176 (e.g., while it is rotated), while in certain embodiments the window 154 is moved up along the left edge 176 after it is docked to the left edge 176.

Figure 7A:
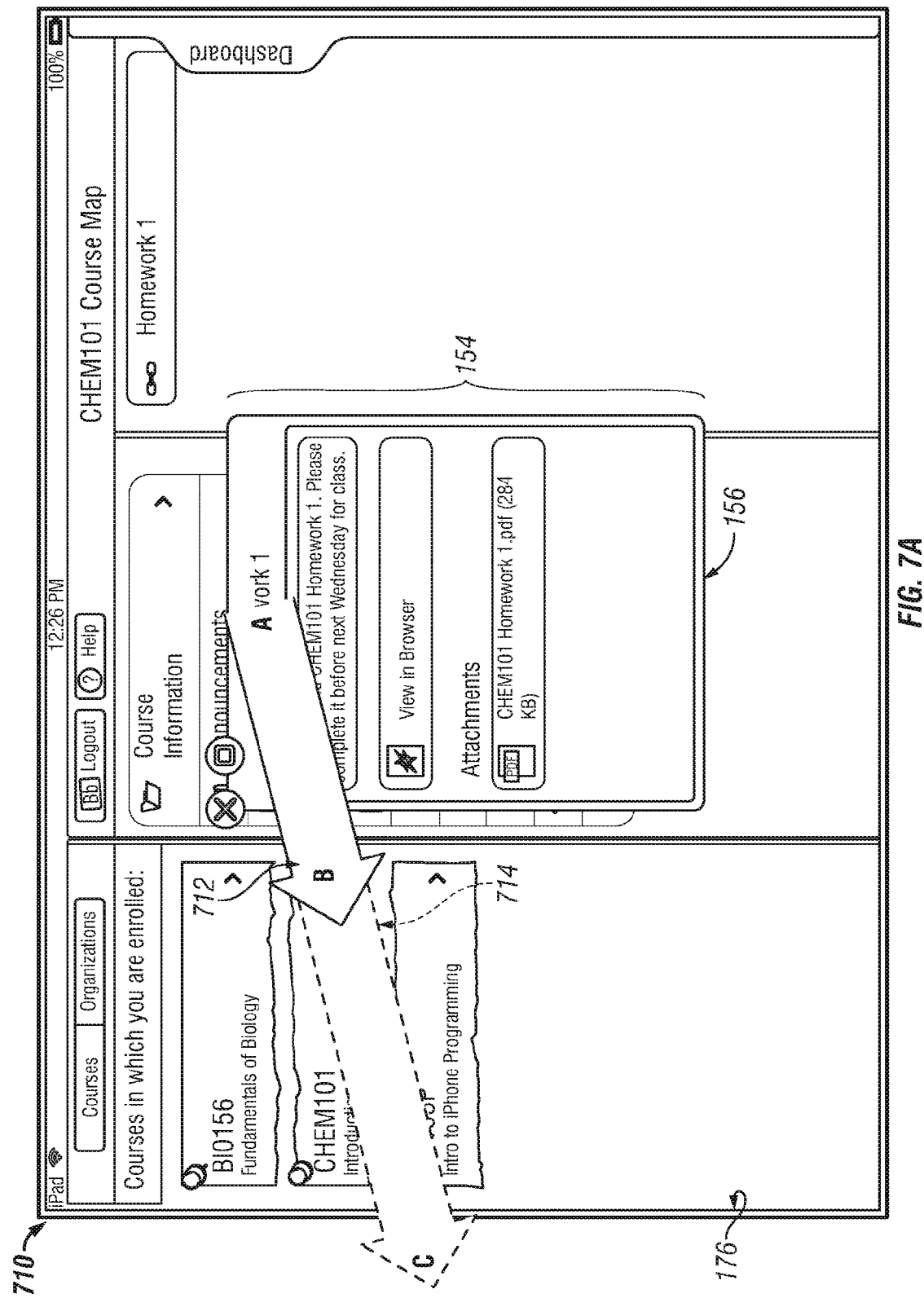
FIGS. 7A-7E illustrate exemplary screenshots for docking a window to a first edge of a display area, and re-docking the window from the first edge to a second edge of the display area, using the system of FIG. 1A.

FIGS. 7A-7E illustrate exemplary screenshots for docking a window to a first edge of a display area, and re-docking the window to a second edge of the display area, using the system of FIG. 1A. FIG. 7A illustrates an exemplary screenshot 710 with a window 154 displayed in an initial position. A window docking input is received from a user indicating a request to dock the window 154 at a predefined docking point 176, the left edge 176 of the displayable area. The window docking input includes the user selecting and holding (e.g., via an input device) a portion of the window 154 (e.g., the frame portion 156) and dragging the window 154 from point A to point B of vector 712 such that the window 154 is projected to have a final destination (e.g., based on the velocity of the window movement between points A and B of vector 712) of point C of vector 714, which is beyond the displayable area of the screenshot 710.

Figure 7B:
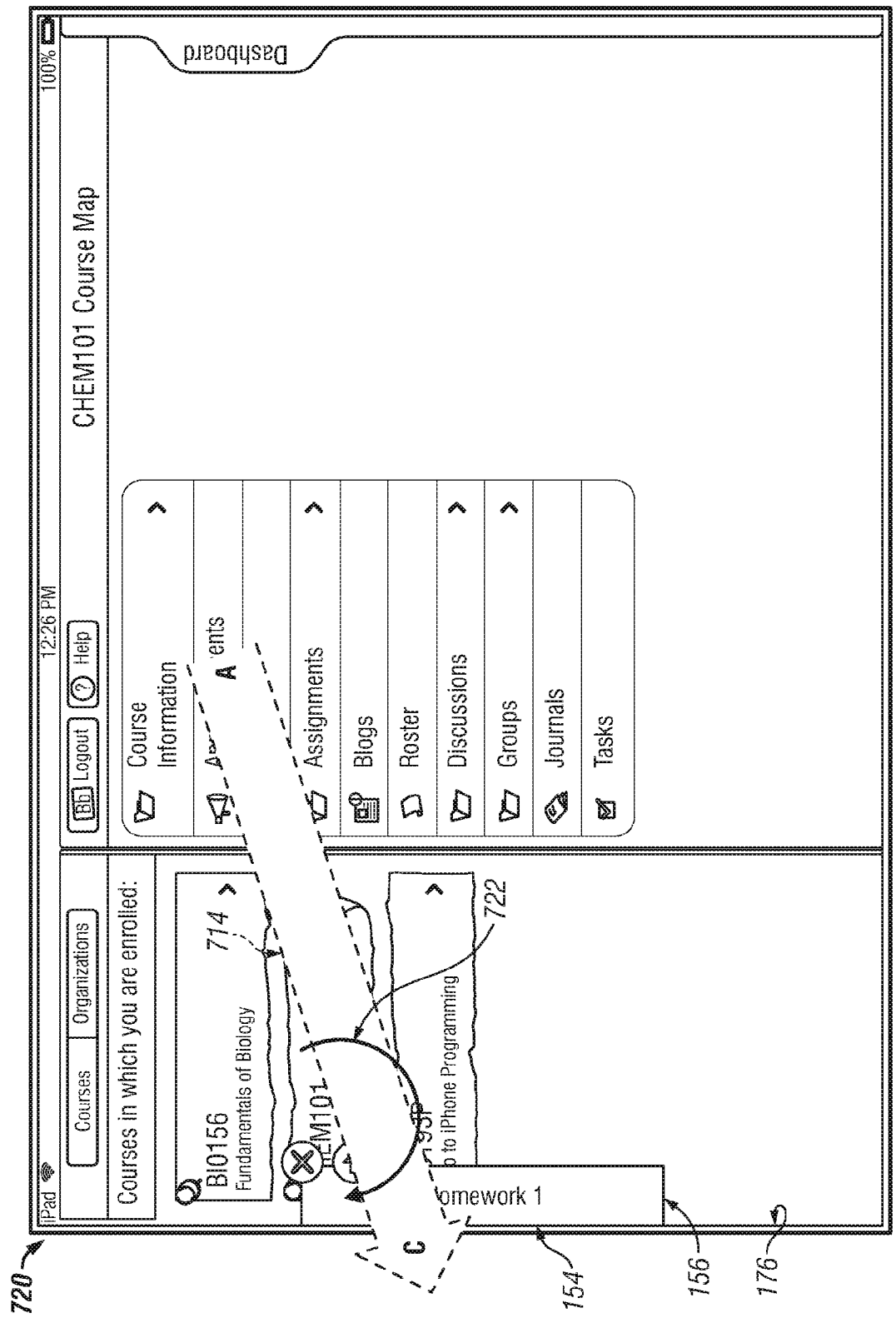

FIG. 7B illustrates an exemplary screenshot 720 of the window 154 of FIG. 7A after it has been docked at a predefined docking point, the left edge 176 of the displayable area 720. The window 154 was moved along the path projected by vector 714 towards end point C of vector 714 beyond the left edge 176 of the displayable area on the screenshot 720. The window 154 was rotated in a clockwise direction 722 along vector 714 while it moved towards the predefined docking point 178. The window 154 is illustrated docked at the predefined docking point 176 in a position corresponding to where the vector 714 intersected with the predefined docking point, the left edge 176 of the displayable area 720.

Figure 7C:
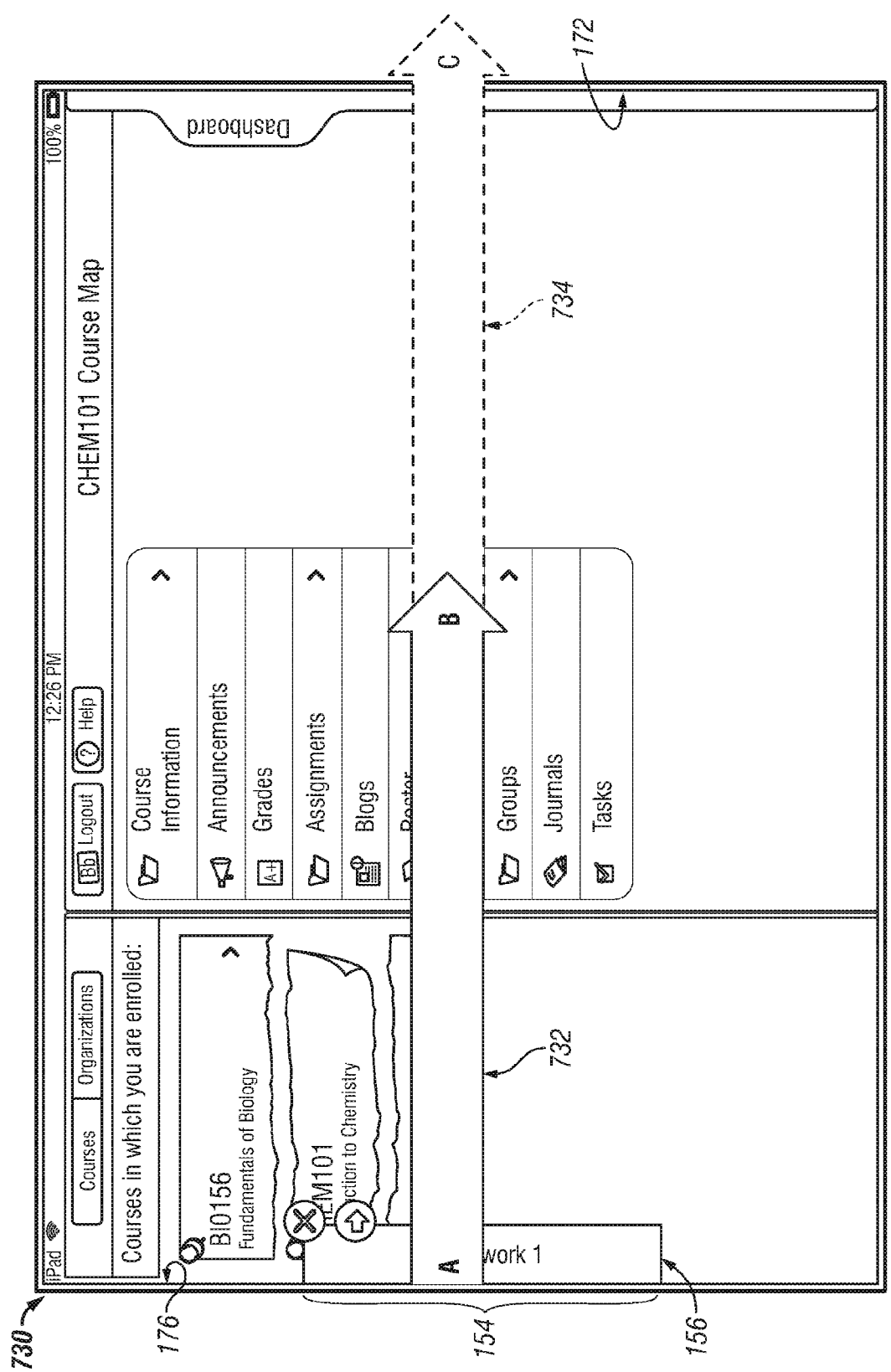

FIG. 7C illustrates an exemplary screenshot 730 with the window 154 of FIG. 7B docked at the predefined docking point 176. A window docking input is received from a user indicating a request to dock the window 154 from predefined docking point 176 on the left edge 176 of the displayable area to the predefined docking point 172, the right edge 172 of the displayable area. The window docking input includes the user selecting and holding (e.g., via an input device) a portion of the window 154 (e.g., the frame portion 156) and dragging the window 154 from point A to point B of vector 732 such that the window 154 is projected to have a final destination (e.g., based on the velocity of the window movement between points A and B of vector 732) of point C of vector 734, which is beyond the displayable area of the screenshot 730.

Figure 7D:
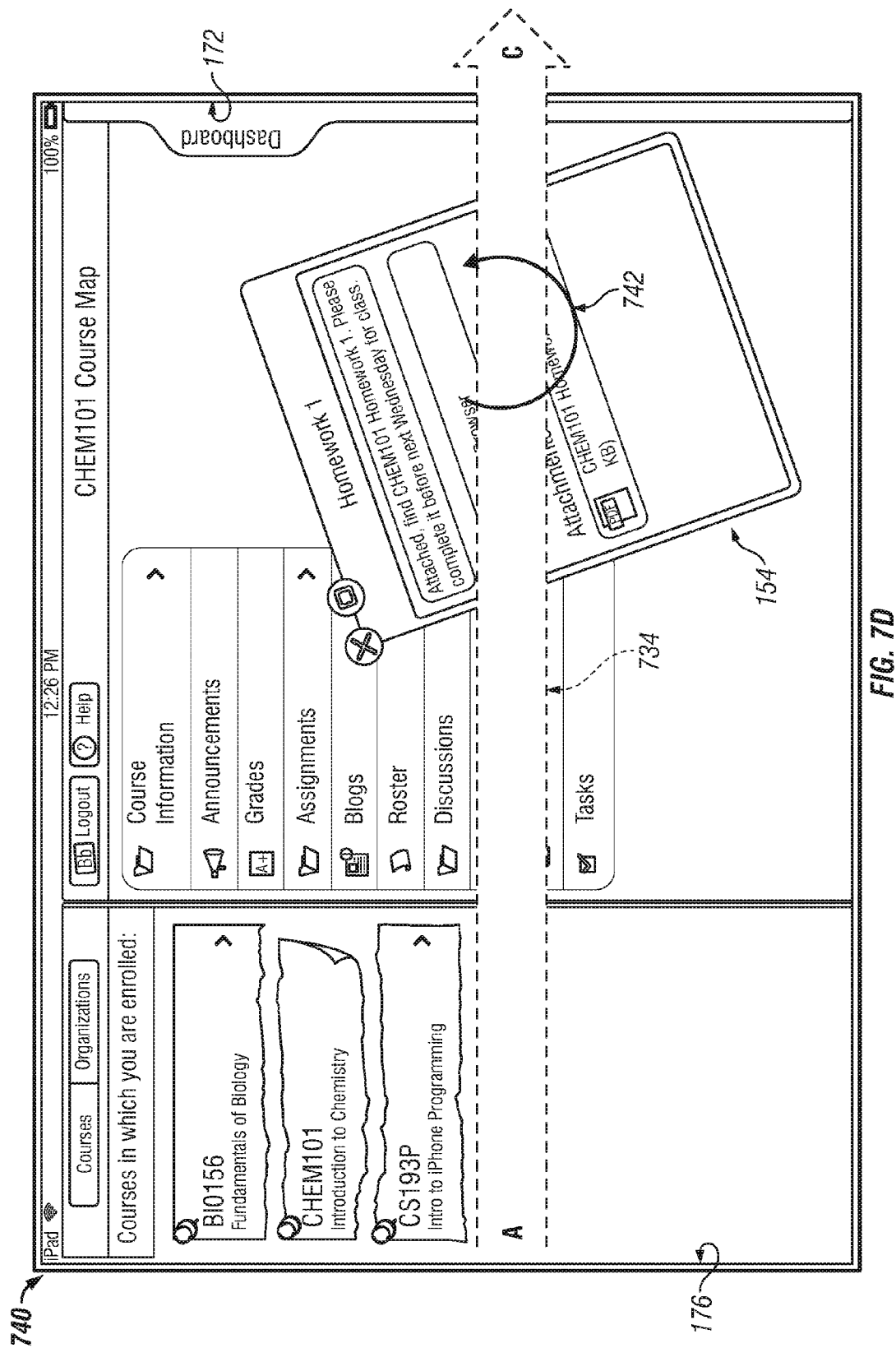

FIG. 7D illustrates an exemplary screenshot 740 after the user has released the window 154 at point B of vector 732. The window 154 continues to move along the path projected by vector 734 towards end point C of vector 734 beyond the right edge 172 of the displayable area on the screenshot 740. The window 154 rotates in a counterclockwise direction 742 along vector 734 while moving towards the predefined docking point 172.

Figure 7E:
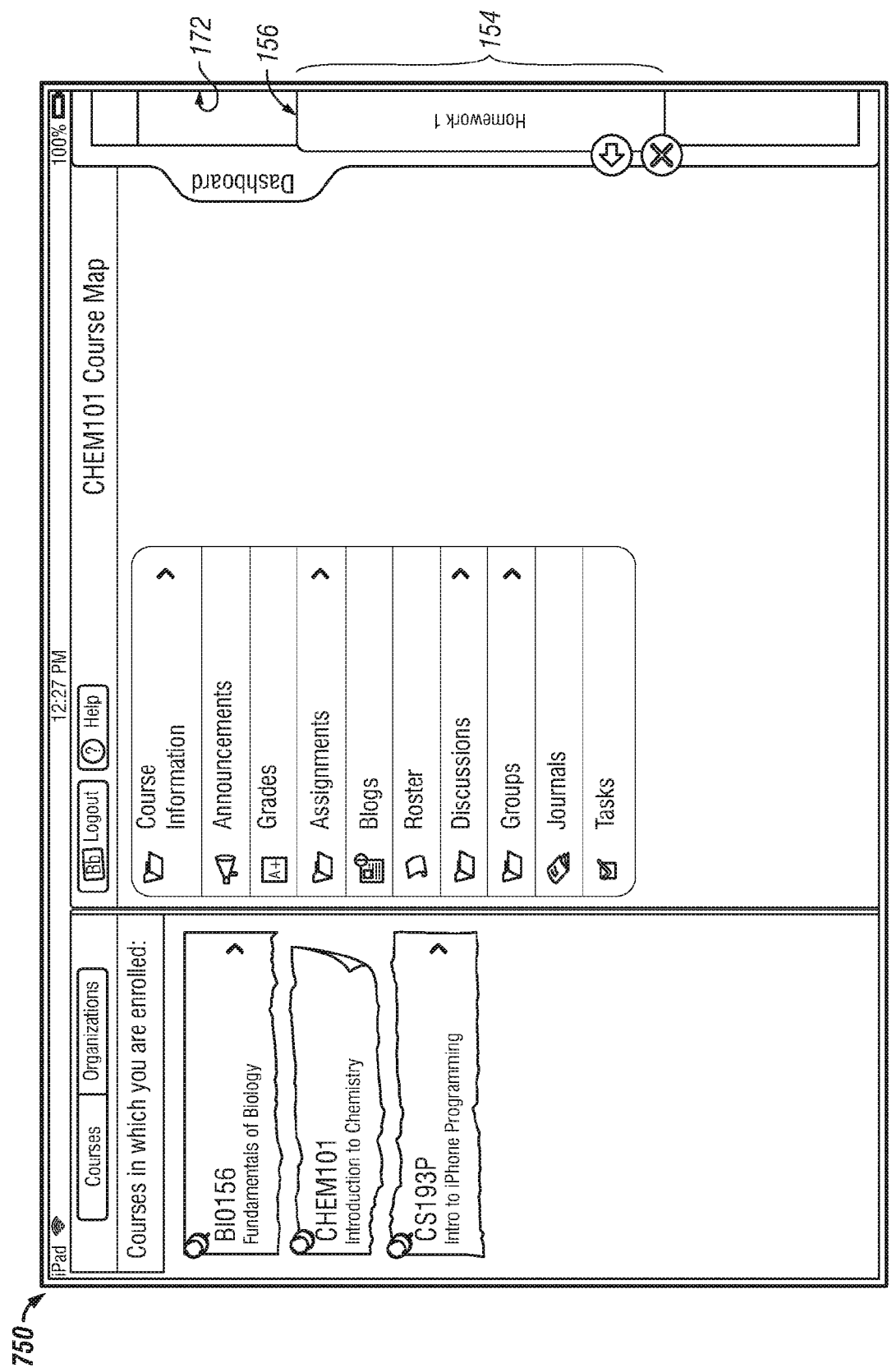

FIG. 7E illustrates an exemplary screenshot 750 of the window 154 of FIG. 7A after it has been docked at a predefined docking point, the right edge 172 of the displayable area 750. The window 154 is docked at the predefined docking point 172 in a position corresponding to where the vector 734 of FIG. 7D intersected with the predefined docking point, the right edge 172 of the displayable area 750.

Figure 8A:
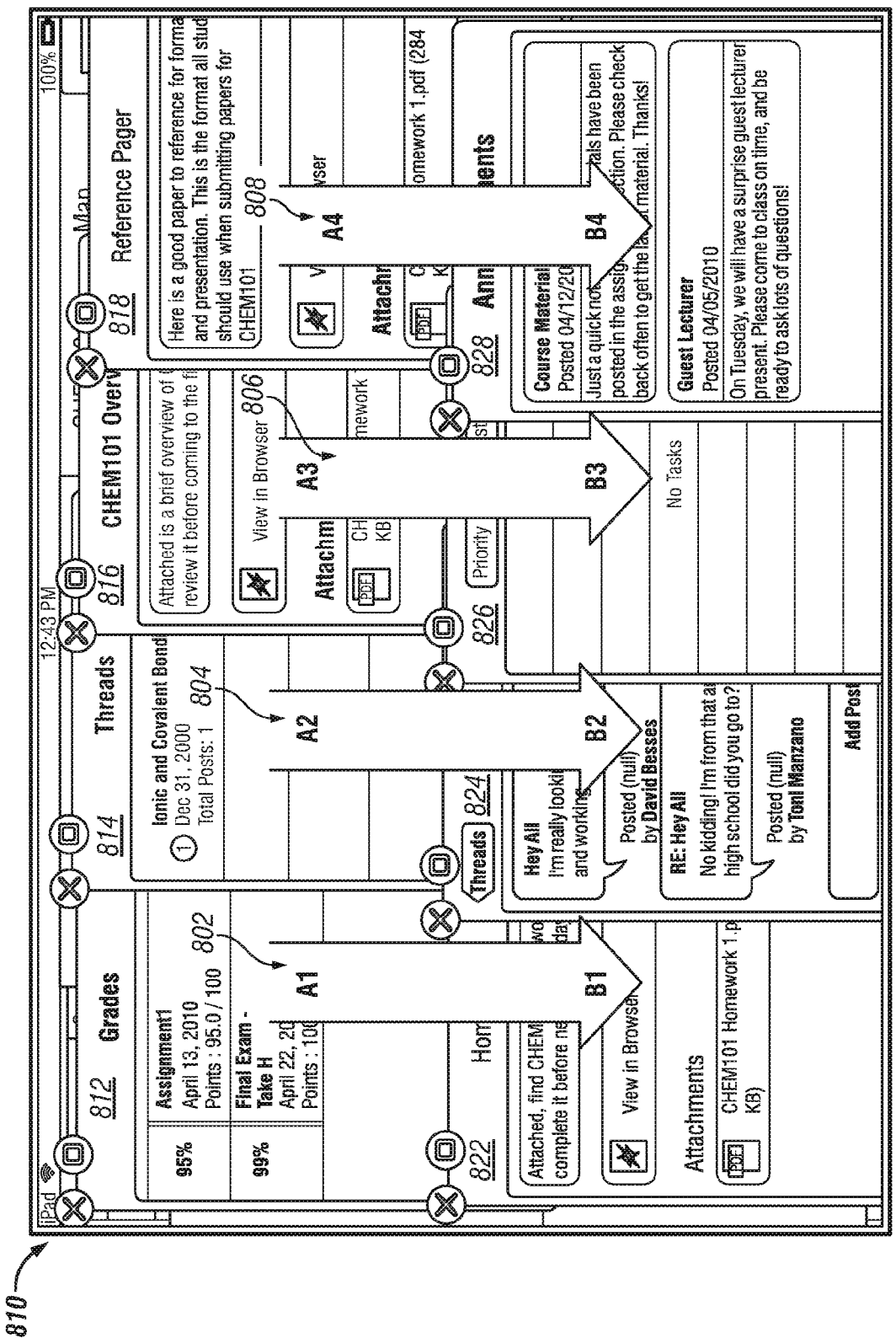
FIGS. 8A-8D illustrate exemplary screenshots for simultaneously docking and undocking a plurality of windows to and from a plurality of corner edges of a display area using the system of FIG. 1A.
Figure 8B:
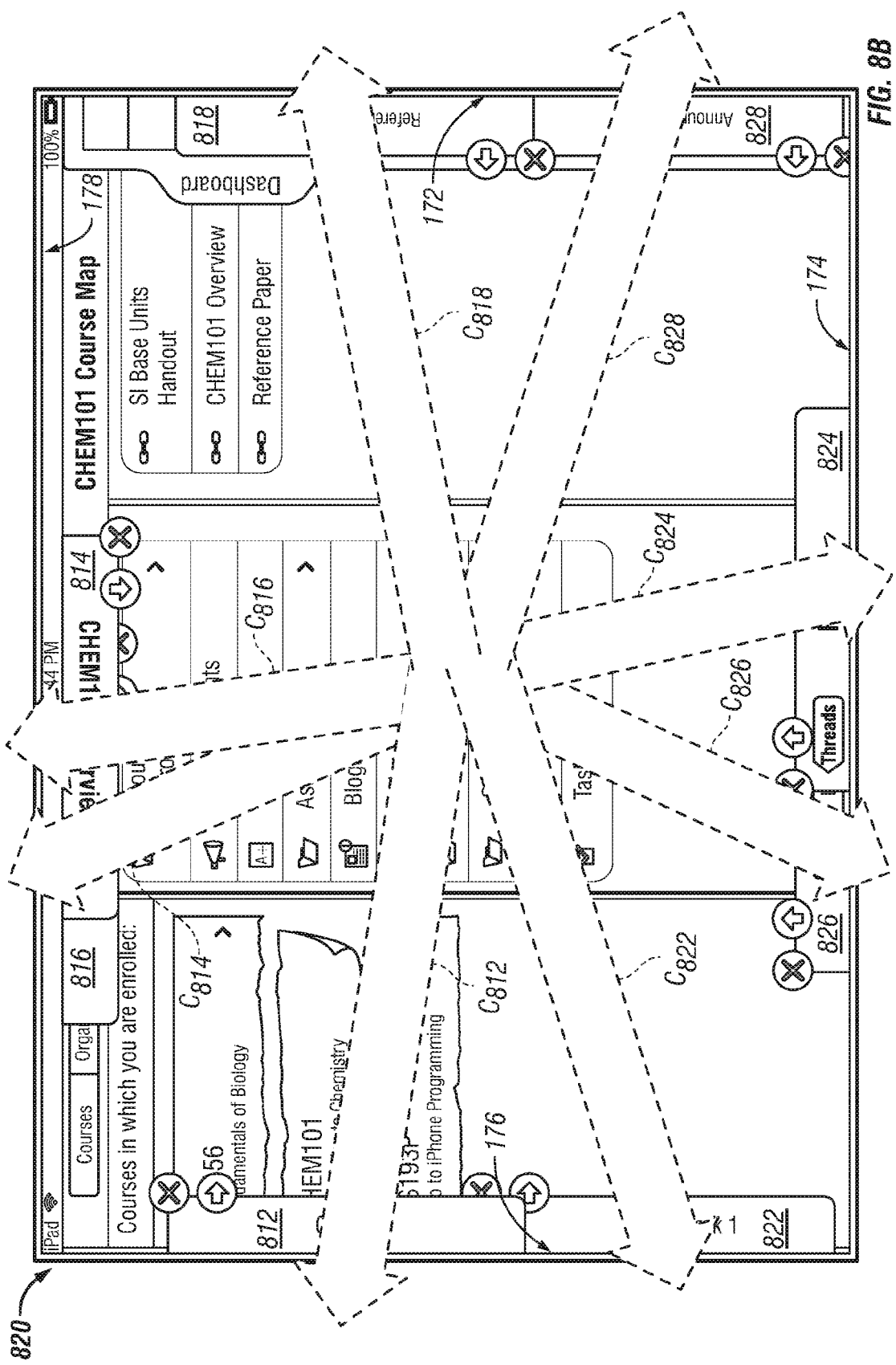

FIGS. 8A and 8B illustrate exemplary screenshots 810, 820, 830, and 840 for simultaneously docking a plurality of windows 812, 814, 816, 818, 822, 824, 826, and 828 to a plurality of corner edges 172, 174, 176, and 178 of a display area 810 using the system 100 of FIG. 1A. FIG. 8A illustrates an exemplary screenshot 810 with a plurality of windows 812, 814, 816, 818, 822, 824, 826, and 828 displayed in an initial position. An all-window docking input is received from a user indicating a request to simultaneously dock each of the plurality of windows at a predefined docking point is received.

The user provides four separate inputs represented by vectors 802, 804, 806, and 808, which represent the distance and direction of inputs provided by the user. For example, a user via a touch screen 116 provides four haptic inputs, e.g., presses on the display area with four of her fingers, at point $A_1$ for vector 802, point $A_2$ for vector 804, point $A_3$ for vector 806, and point $A_4$ for vector 808, and drags her four fingers from points $A_1$, $A_2$, $A_3$, and $A_4$, to points $B_1$, $B_2$, $B_3$, and $B_4$, respectively, along vectors 802, 804, 806, and 808 towards the bottom of the screenshot 810.

In certain embodiments, a user's input is determined to be an all-window docking input based on whether the distance between points A and B of each of vectors 802, 804, 806, and 808 is equal to or greater than a predefined distance. In certain embodiments, the windows 812, 814, 816, 818, 822, 824, 826, and 828 are simultaneously docked regardless of the direction of one or any combination of vectors 802, 804, 806, and 808. In certain embodiments, the windows 812, 814, 816, 818, 822, 824, 826, and 828 are simultaneously docked based on the direction of one or any combination of vectors 802, 804, 806, and 808.

FIG. 8B illustrates an exemplary screenshot 820 of the windows 812, 814, 816, 818, 822, 824, 826, and 828 of FIG. 8A after they have been simultaneously docked at their corresponding predefined docking points, windows 814 and 816 along the top edge 178 of the displayable area 820, windows 818 and 828 along the right edge 172 of the displayable area 820, windows 824 and 826 along the bottom edge 174 of the displayable area 820, and windows 812 and 822 along the left edge 176 of the displayable area. In response to receiving the all-window docking input of FIG. 8A, each of the windows 812, 814, 816, 818, 822, 824, 826, and 828 is docked at a predefined docking point 172, 174, 176, or 178 in a position corresponding to where its vector $C_{812}$, $C_{814}$, $C_{816}$, $C_{818}$, $C_{822}$, $C_{824}$, $C_{826}$, or $C_{828}$ from the center of the screenshot passes through the center of the windows 812, 814, 816, 818, 822, 824, 826, or 828 and intersects with the predefined docking point. For example, vector $C_{828}$ begins at the center of the screenshot and is directed toward and intersects near the bottom of the right edge 172 of the screenshot because that is the direction in which the center of window 828 is displayed in its initial position (of FIG. 8A). In certain embodiments, other ways can be used to determine, among a plurality of predefined docking points, at which predefined docking point a window should be docked. The visual display and window portion hiding of the docking is similar to the visual display (e.g., rotation) and window portion hiding described above with reference to FIGS. 2A-7E.

Figure 8C:
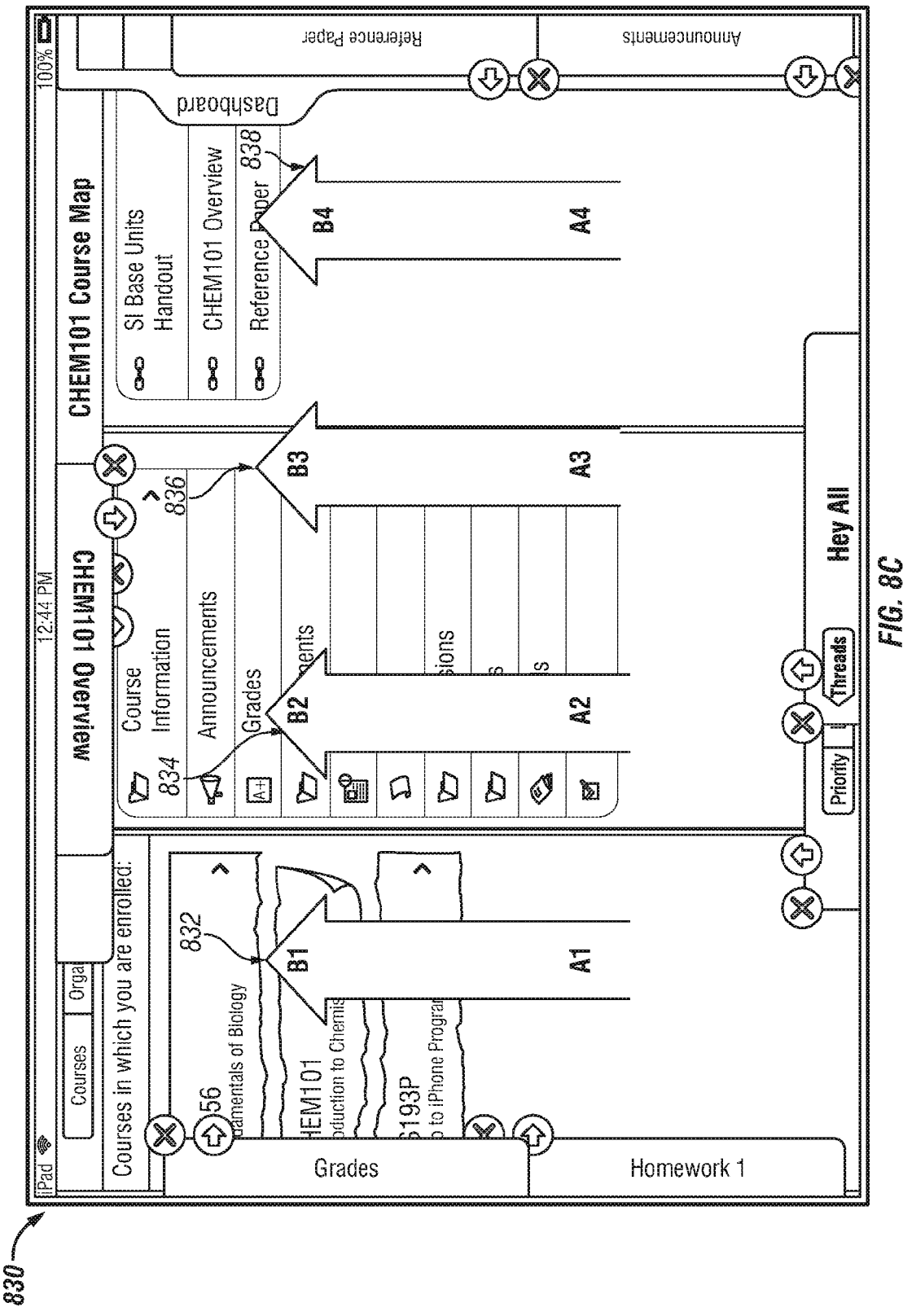

FIG. 8C illustrates providing an all-window undocking input that indicates a request to simultaneously undock each of the plurality of windows, 812, 814, 816, 818, 822, 824, 826, or 828 from its predefined docking points 172, 174, 176, or 178 and returning it to its initial position.

The user provides four separate inputs represented by vectors 832, 834, 836, and 838, which represent the distance and direction of inputs provided by the user. For example, a user via a touch screen 116 provides four haptic inputs, e.g., presses on the display area with four of her fingers, at point $A_1$ for vector 832, point $A_2$ for vector 834, point $A_3$ for vector 836, and point $A_4$ for vector 838, and drags her four fingers from points $A_1$, $A_2$, $A_3$, and $A_4$, to points $B_1$, $B_2$, $B_3$, and $B_4$, respectively, along vectors 832, 834, 836, and 838 towards the top of the screenshot 810.

Figure 8D:
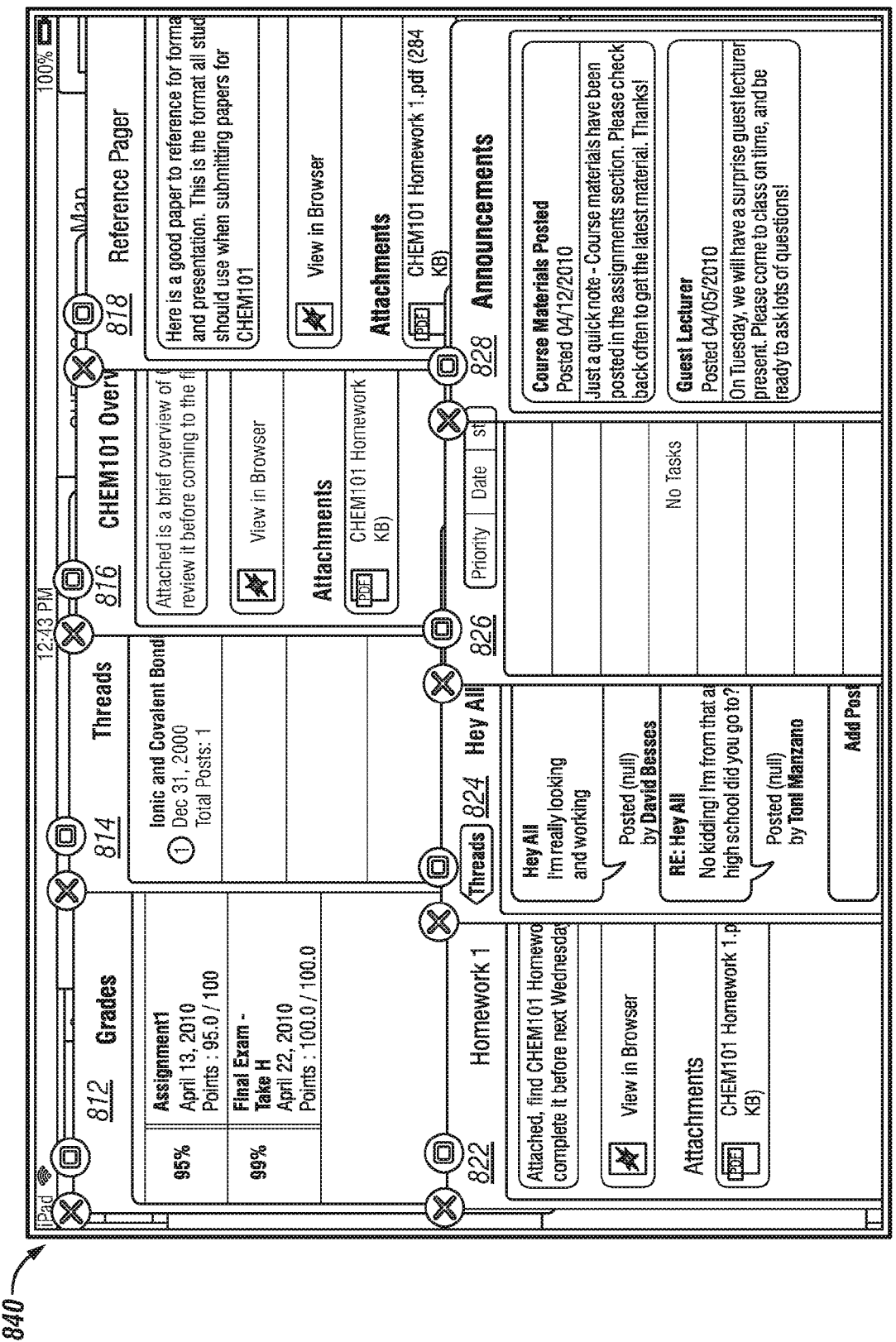

FIG. 8D illustrates an exemplary screenshot 840 of the windows 812, 814, 816, 818, 822, 824, 826, and 828 of FIG. 8C after they have been simultaneously undocked from their corresponding predefined docking points, windows 814 and 816 along the top edge 178 of the displayable area 820, windows 818 and 828 along the right edge 172 of the displayable area 820, windows 824 and 826 along the bottom edge 174 of the displayable area 820, and windows 812 and 822 along the left edge 176 of the displayable area. In response to receiving the all-window undocking input of FIG. 8C, each of the windows 812, 814, 816, 818, 822, 824, 826, and 828 is undocked from a predefined docking point 172, 174, 176, or 178 and returned to its initial position (see FIG. 8A). The visual display of the undocking is similar to the visual display (e.g., rotation) described above with reference to FIGS. 2A-7E.

In certain embodiments, a user's input is determined to be an all-window undocking input based on whether the distance between points A and B of each of vectors 832, 834, 836, and 838 is equal to or greater than a predefined distance. In certain embodiments, the windows 812, 814, 816, 818, 822, 824, 826, and 828 are simultaneously undocked regardless of the direction of one or any combination of vectors 832, 834, 836, and 838. In certain embodiments, the windows 812, 814, 816, 818, 822, 824, 826, and 828 are simultaneously undocked based on the direction of one or any combination of vectors 832, 834, 836, and 838.

Although the exemplary screenshots 810 and 830 of FIGS. 8A and 8C illustrate an embodiment in which four inputs (802, 804, 806, and 808 in FIGS. 8A and 832, 834, 836, and 838 in FIG. 8C) are used, in certain embodiments, other numbers of inputs can be used, such as one, two, three, five, or greater than five inputs. Furthermore, any number of windows can be simultaneously docked in the embodiment illustrated in exemplary screenshots 810 and 830 of FIGS. 8A and 8C, respectively, from one window to many windows.

Figure 9A:
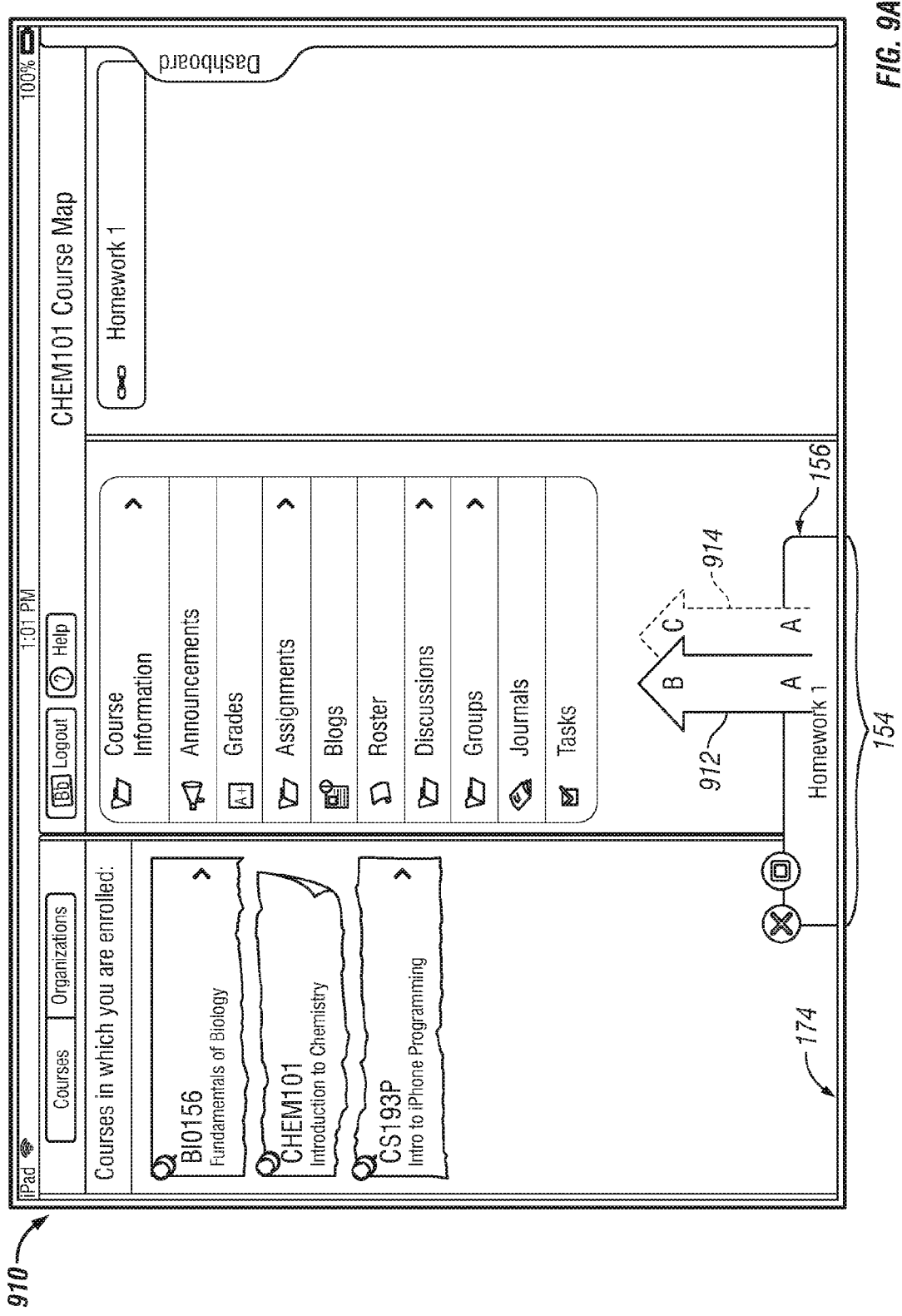
FIGS. 9A and 9B illustrate exemplary screenshots for previewing a docked window using the system of FIG. 1A.
Figure 9B:
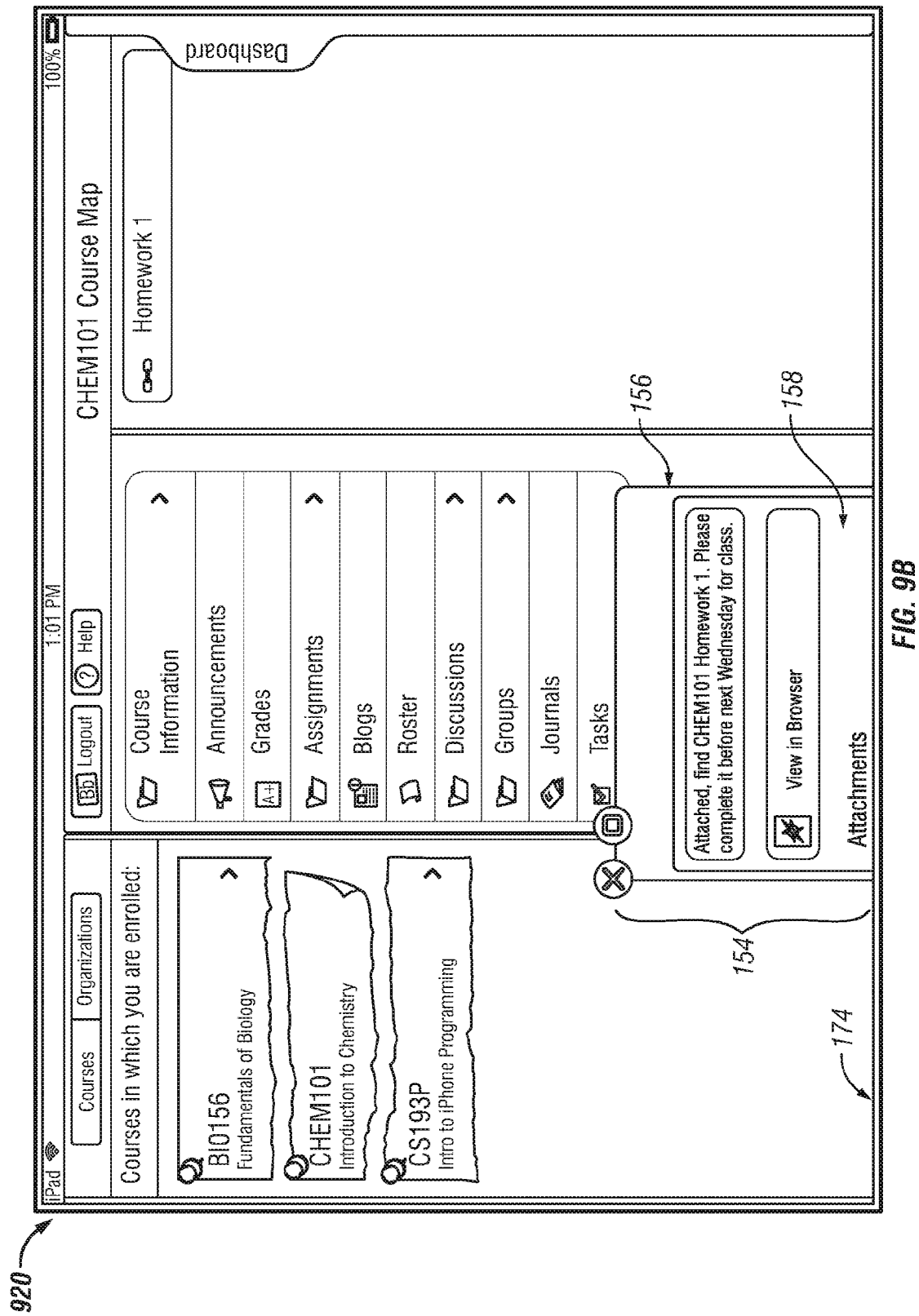

FIGS. 9A and 9B illustrate exemplary screenshots 910 and 920 for previewing a docked window 154 using the system 100 of FIG. 1A. FIG. 9A illustrates providing a window view input that indicates a request to view the window 154 from the predefined docking point 174 without undocking the window 154 and returning the window 154 to its initial position. The user selects and holds a displayable portion of the window 154 (e.g., the frame portion 156) to drag the window 154 from point A of vector 912 at the predefined docking point 172 to point B of vector 912. The velocity at which the user drags the window 154 from point A to point B of vector 912 is such that the projected end final destination of the window 154 is point C of vector 914, which is no further than point B of vector 912. Accordingly, the action of the user is not determined to be a window undocking input as discussed with reference to FIGS. 2D-2F. In certain embodiments, a user's input is determined to be a window undocking input based on whether the distance between points A and B, and/or points A and C, are less than or equal to a predefined distance or a predefined velocity or both.

FIG. 9B illustrates an exemplary screenshot 920 of the window 154 of FIG. 9A as the user holds the displayable portion of the window 154 (e.g., the frame portion 156) at point B of vector 912. As illustrated in the exemplary screenshot 920, a portion of the window 154 is displayed without the window 154 having been undocked. In certain embodiments, the window 154 rotates as it is displayed, for example, when the window 154 is docked on the right edge or the left edge of the screenshot 920. Once the user releases the displayable portion of the window 154, the window returns to the predefined docking point, the bottom edge 174 of the screenshot 920.

Figure 10A:
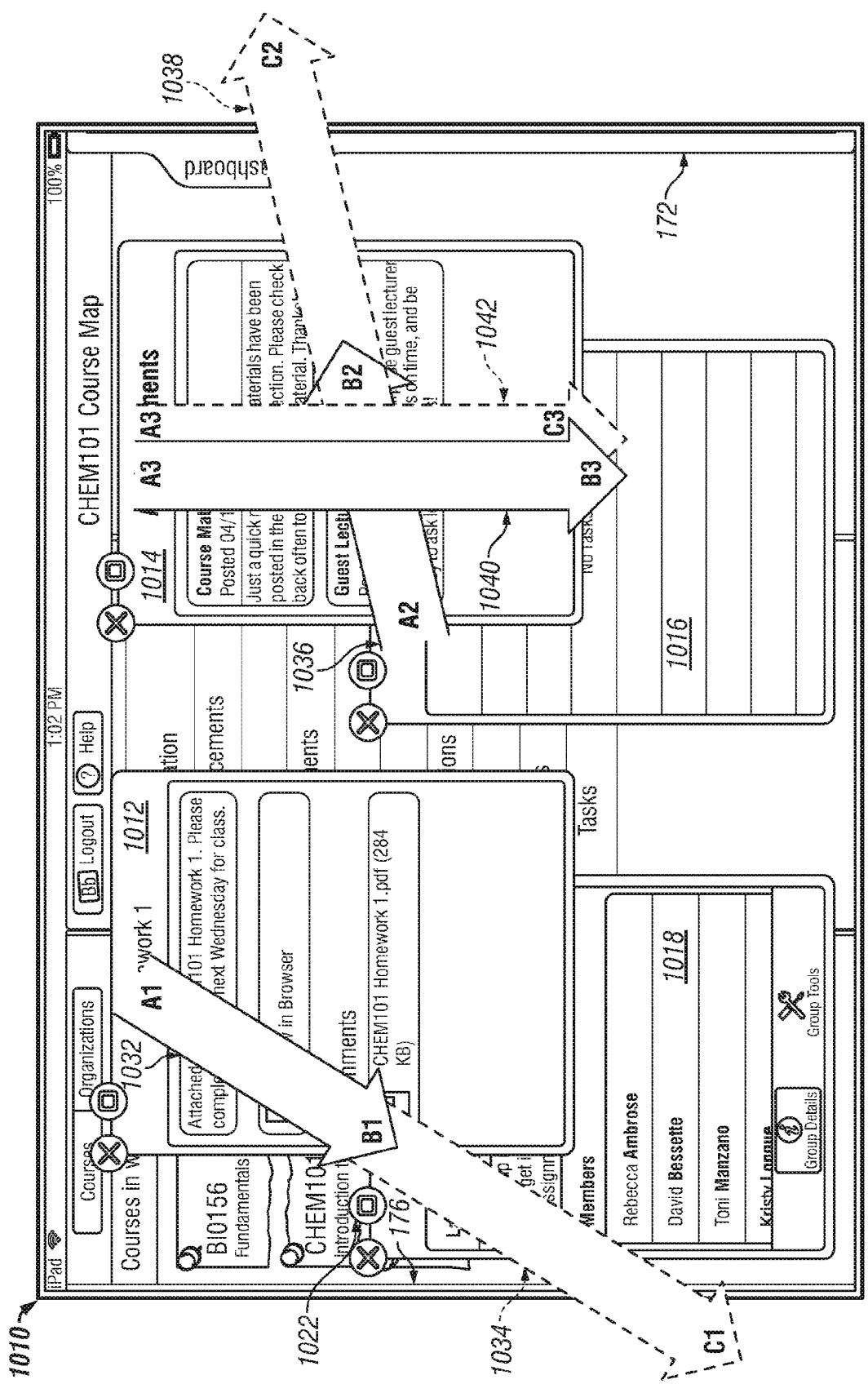

FIGS. 10A and 10B illustrate exemplary screenshots 1010 and 1020 for simultaneously interacting with a plurality of windows 1012, 1014, 1016, and 1018 with separate inputs 1032, 1040, 1036, and 1022 using the system 100 of FIG. 1A. Each of the inputs 1032, 1040, 1036, and 1022 is provided separately by a user.

For example, windows 1012 and 1016 are docked to predefined docking points 176 and 172 because they each receive a window docking input (i.e., simultaneous inputs by the user indicating moving windows 1012 and 1016 according to vectors 1032 and 1036 that project the final destination of the windows 1012 and 1016 to be, based on velocity vectors 1032 and 1038, beyond the displayable area of the screenshot 1010). Simultaneously to windows 1012 and 1016 receiving window docking inputs, window 1018 is maximized by the user pressing the maximize button 1022 and window 1014 is moved downward because the user input indicates moving window 1014 according to vector 1040 that projects the final destination of the window 1014 to be, based on velocity vector 1042, within the displayable area of the screenshot 1010. The user can simultaneously provide the inputs by, for example, using a finger for each input applied to a touch screen input display (i.e., haptic inputs). Any number of inputs can be received and simultaneously processed by the system 100, such as one, two, three, or more than three inputs. The inputs can be received within any portion of a window, such as a frame portion or a content portion. The inputs can indicate any acceptable action for a window or its content, such as, but not limited to, undocking a window, closing a window, scrolling window content, zooming in to or out of a window, expanding the frame of the window, and rotating the window.

FIG. 10B illustrates the plurality of windows 1012, 1014, 1016, and 1018 after the separate inputs 1032, 1040, 1036, and 1022 of FIG. 1A have been simultaneously provided by the user. As illustrated, windows 1012 and 1016 have been docked to predefined docking points 176 and 172, respectively, window 1018 has been maximized, and window 1014 has been moved.

Figure 11A:
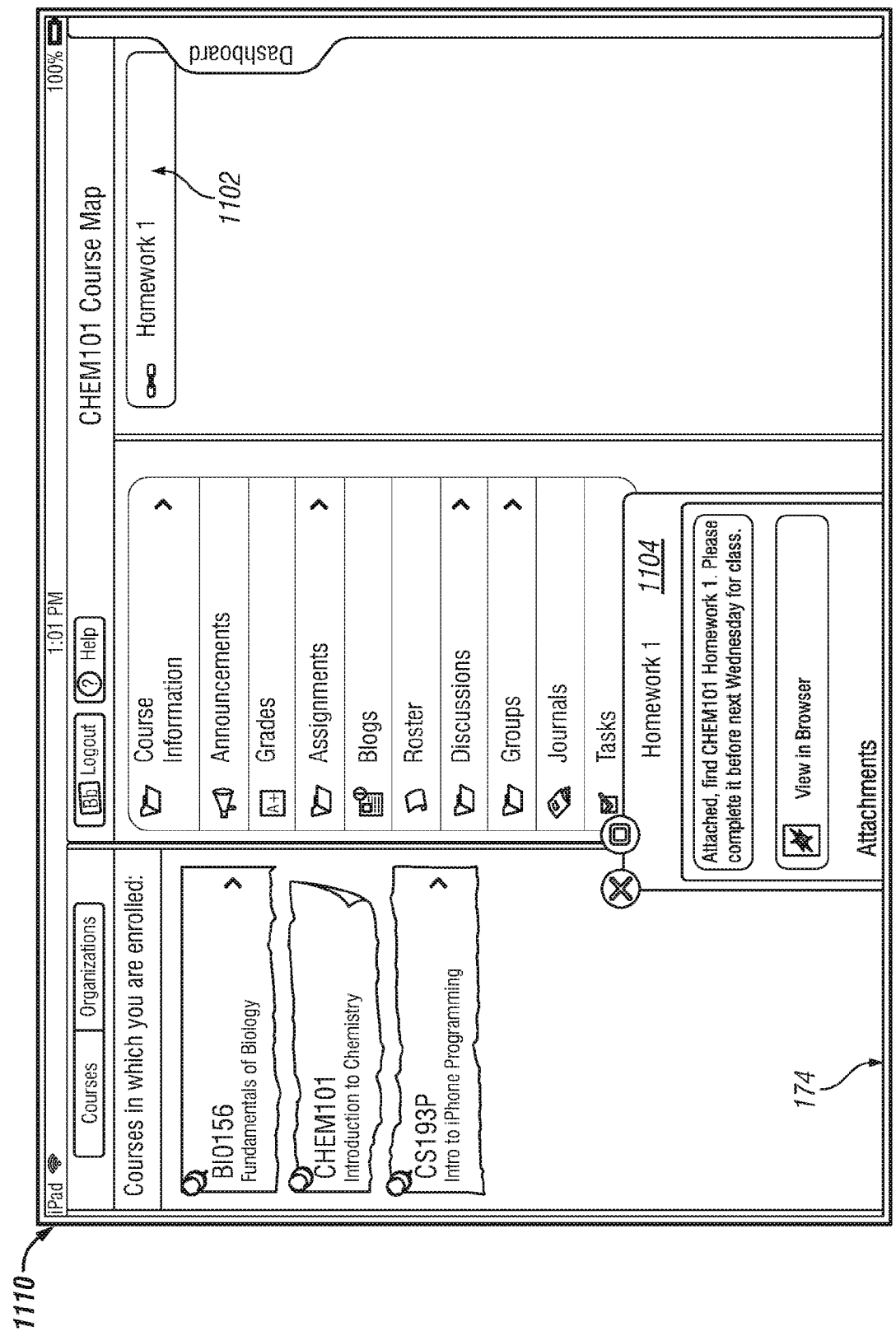
FIGS. 11A and 11B illustrate exemplary screenshots for repositioning and refocusing onto a window after it is called, using the system of FIG. 1A.
Figure 11B:
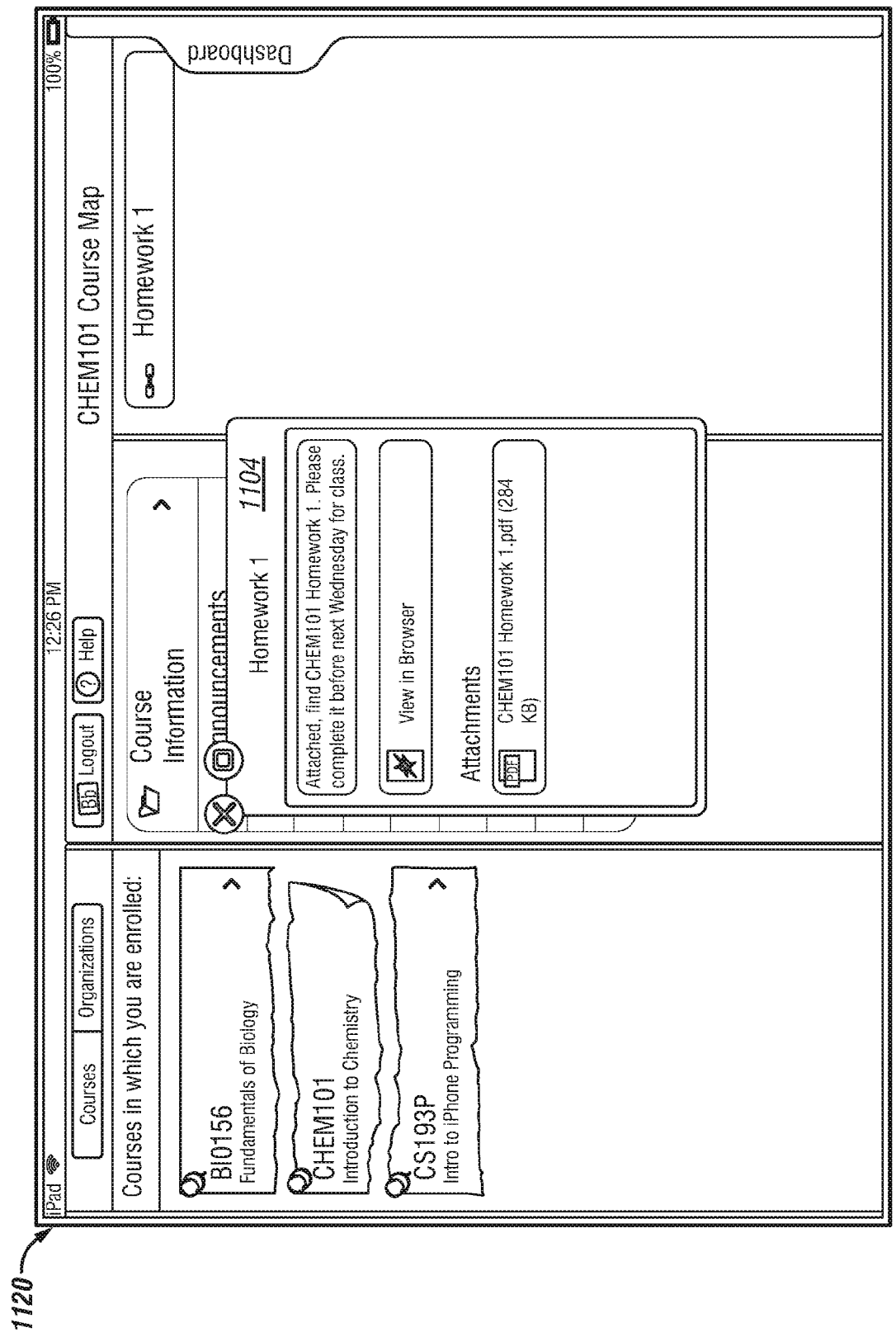

FIGS. 11A and 11B illustrate exemplary screenshots 1110 and 1120 for repositioning and refocusing onto a window 1104 after it is called, using the system 100 of FIG. 1A. Exemplary screenshot 1110 of FIG. 11A illustrates the bottom portion of a "Homework 1" window 1104 being beyond the displayable bottom edge 174 of the screenshot 1110. The window 1104 was originally displayed in response to activation of the "Homework 1" button 1102 by the user, such as by the user pressing a touch screen display at the position where the button 1102 is displayed on the touch screen display. Using the system 100 of FIG. 1A, in response to the user again activating the button 1102, the window 1104 is repositioned, such that it is fully displayed on the screenshot 1120, and refocused, such that if other windows were displayed on the screenshot 1120, the window 1104 would be displayed on the top of the other windows.

Figure 12A:
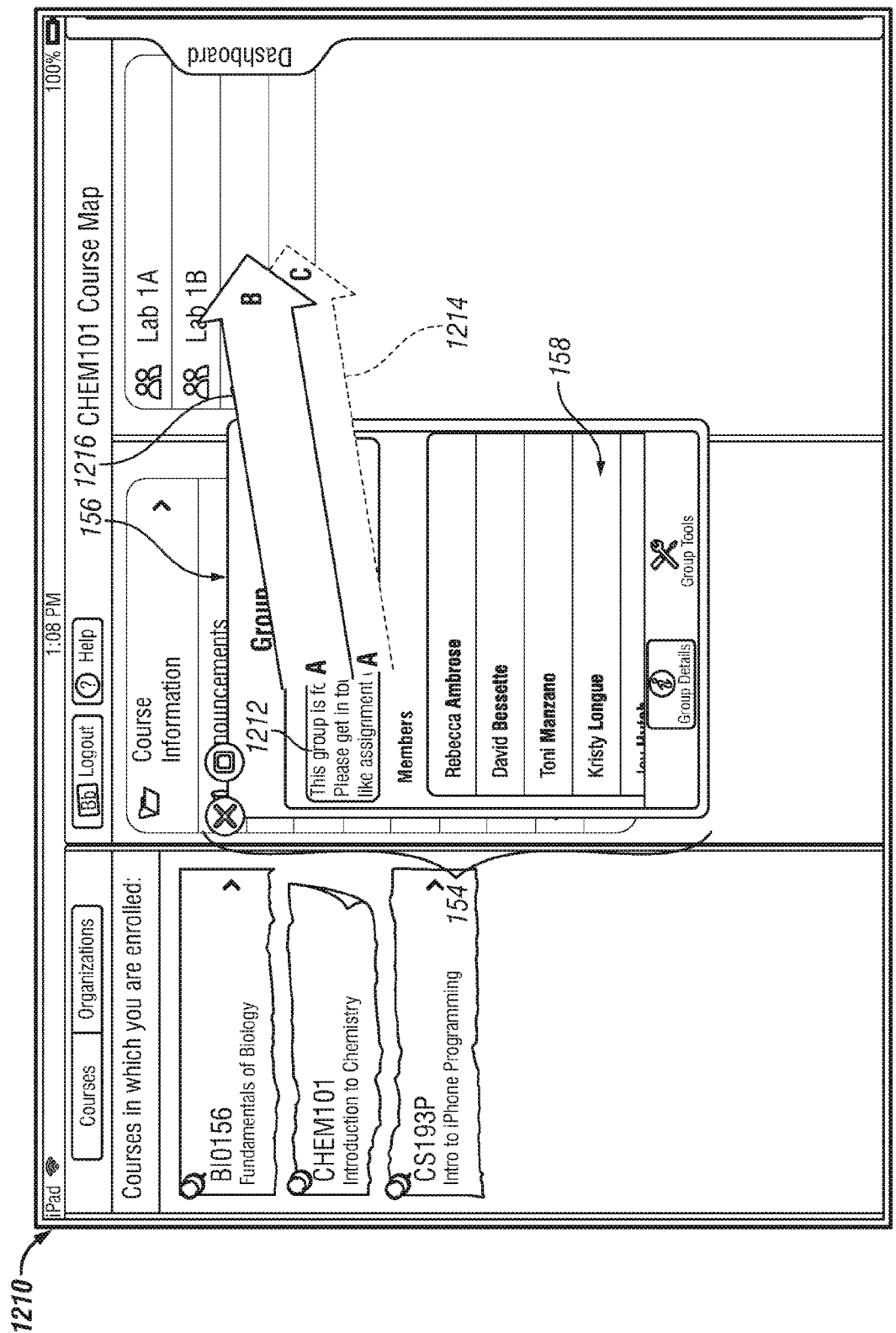
FIGS. 12A and 12B illustrate exemplary screenshots for adjusting a window by user input interacting with an object within the window because the user input is not in accord with the object's predetermined function.
Figure 12B:
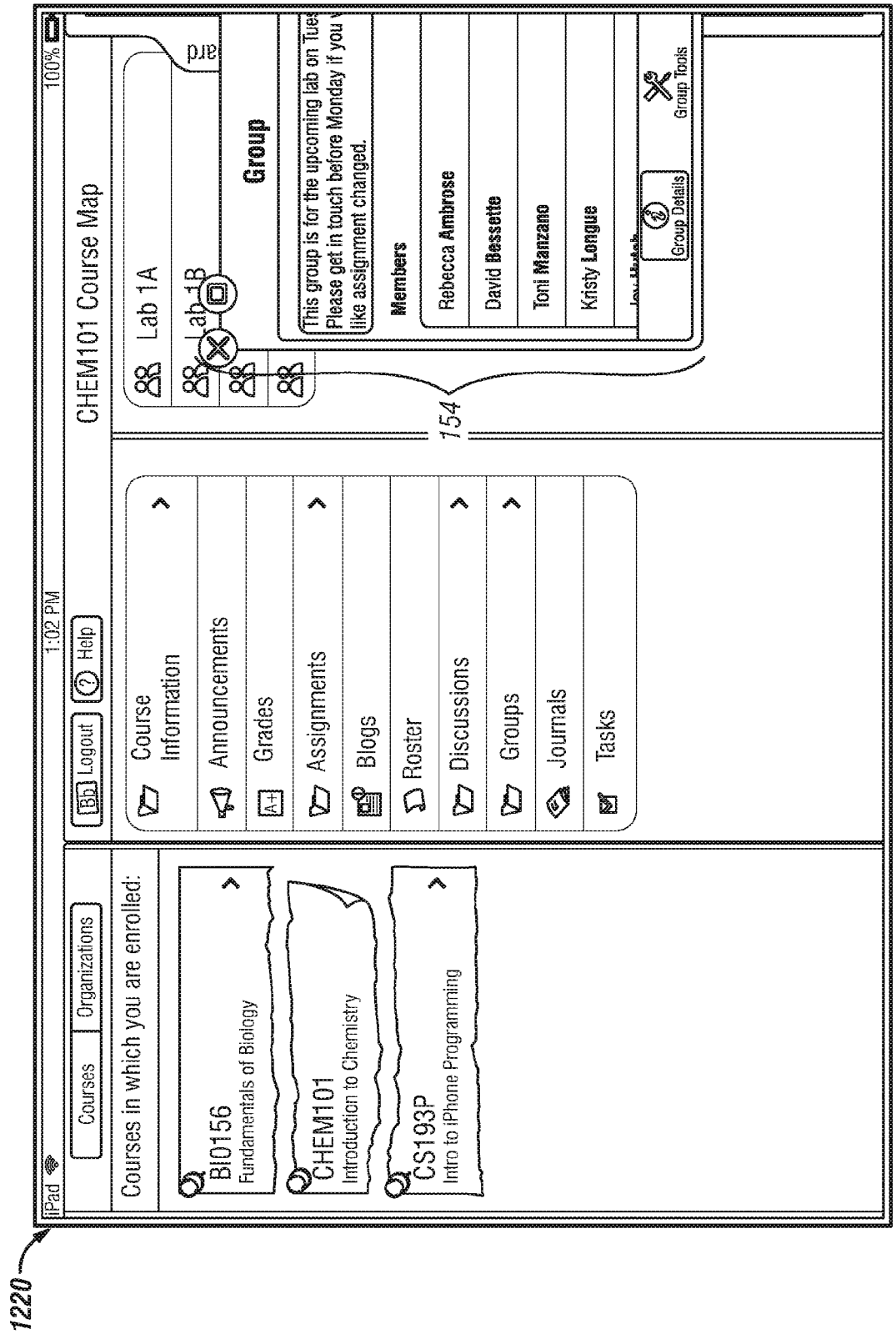

FIGS. 12A and 12B illustrate exemplary screenshots 1210 and 1220 for adjusting a window 154 by user input interacting with an object 1212 within the window 154 because the user input 1216 is not in accord with the object's predetermined function. FIG. 12A illustrates a window 154 that, within its content portion 158 includes a text box object 1212 configured with a predetermined function—to receive text-editing input to edit text (e.g., a haptic tap or single click within the text box object 1212 indicating a user's desire to edit any text within the text box 1212). The user, however, provides a window adjust input for the window 154, that is different than the input for the predetermined function, that indicates a request to adjust the window 154. As discussed herein, a window adjust input is a request to adjust a window 154, such as, and without limitation, moving the window 154, resizing the window 154, zooming into or out of a window, and rotating the window. The window adjust input is received within the frame portion 158 of the window 154. For example, the user selects the window within the text box object 1212 of the frame portion 158 of the window, and then drags the window 154 from point A to point B of vector 1216 such that the endpoint of the window 154 position is projected, based on the velocity at which the window 154 is dragged between points A and B of vector 1216, to be point C of vector 1214. Because the input provided by the user was not a predetermined function for the object, i.e., it was not a text-editing input to edit text of the text box object 1212, but was instead determined to be a window adjust input, the window 154 is moved to the position illustrated in FIG. 12B.

Other objects, having predetermined functions, that are configured to receive a window adjust input include scroll bars with predetermined directions (e.g., attempting to scroll a scroll bar in a direction other than it is designated will result in moving the window containing the scroll bar), and buttons with predetermined activations (e.g., attempting to move a button instead of pressing or holding it will result in moving the window containing the button).

Figure 13:
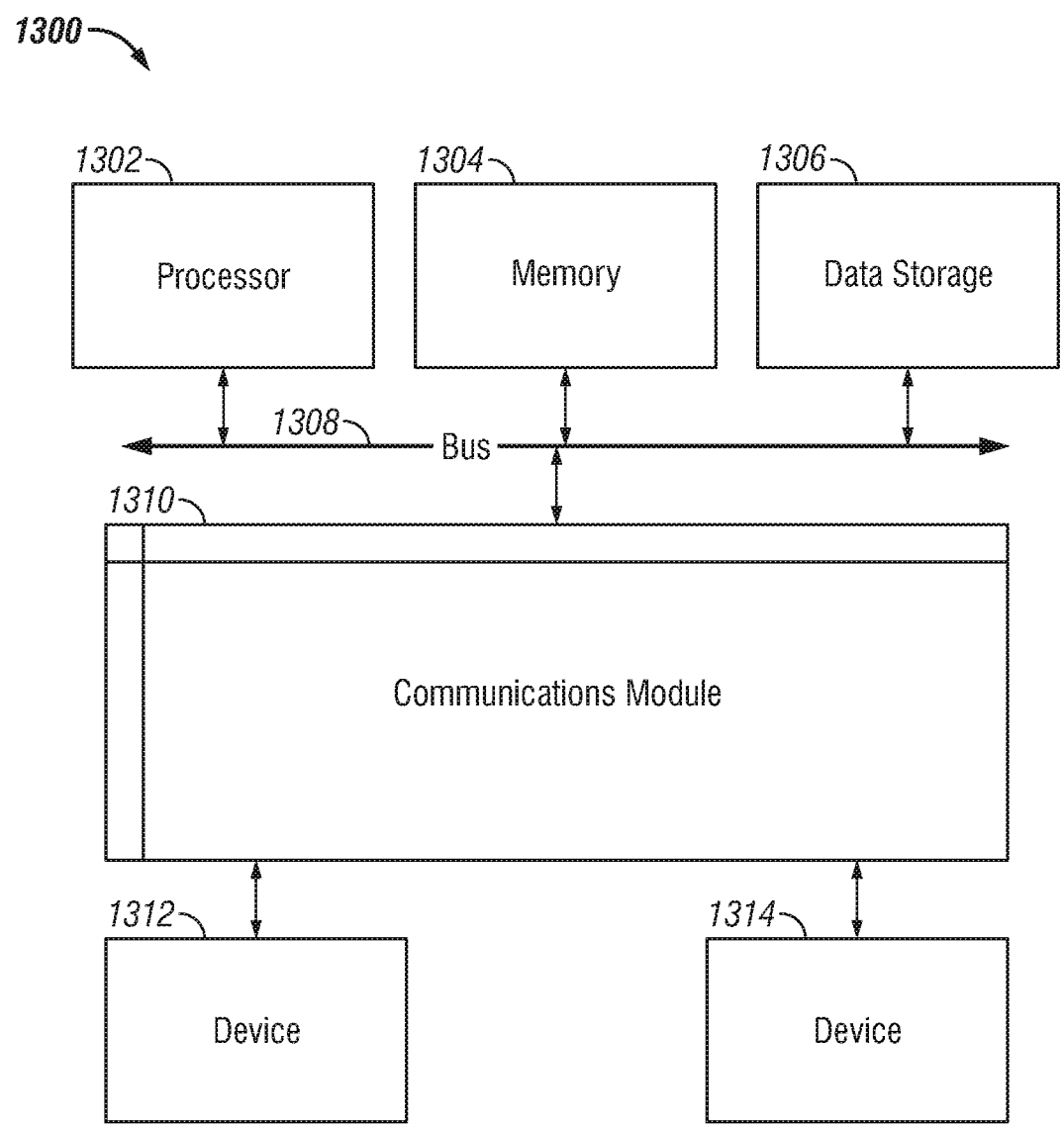
FIG. 13 is a block diagram illustrating an example of a computer system with which the graphical user interface computing system of FIG. 1A can be implemented.

FIG. 13 is a block diagram illustrating an example of a computer system 1300 with which the graphical user interface computing system 100 of FIG. 1A can be implemented. In certain embodiments, the computer system 1300 may be implemented using software, hardware, or a combination of both, either in a dedicated server, or integrated into another entity, or distributed across multiple entities.

Computer system 1300 (e.g., system 100 of FIG. 1A) includes a bus 1308 or other communication mechanism for communicating information, and a processor 1302 (e.g., processor 112 from FIG. 1A) coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 1300 also includes a memory 1304 (e.g., memory 102 from FIG. 1A), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1308 for storing information and instructions to be executed by processor 1302. The instructions may be implemented according to any method well known to those of skill in the art, including, but not limited to, computer languages such as data-oriented languages (e.g., SQL, dBase), system languages (e.g., C, Objective-C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-english-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1304 may also be used for storing temporary variable or other intermediate information during execution of instructions to be executed by processor 1302. Computer system 1300 further includes a data storage device 1306, such as a magnetic disk or optical disk, coupled to bus 1308 for storing information and instructions.

Computer system 1300 may be coupled via communications module 1310 to a device 1312 (e.g., display device 118 of FIG. 1A), such as a CRT or LCD for displaying information to a computer user. Another device 1314 (e.g., input device 116 of FIG. 1A), such as, for example, a keyboard, or a mouse may also be coupled to computer system 1300 via communications module 1310 for communicating information and command selections to processor 1302. The communications module 1310 can be any input/output module.

According to one aspect of the present disclosure, a mobile delivery system for institutional content 100 can be implemented using a computer system 1300 in response to processor 1302 executing one or more sequences of one or more instructions contained in memory 1310. Such instructions may be read into memory 1310 from another machine-readable medium, such as data storage device 1306. Execution of the sequences of instructions contained in main memory 1310 causes processor 1302 to perform the process steps described herein. One or more processors in a multi-processing arrangement may also be employed to execute the sequences of instructions contained in memory 1310. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 1302 for execution. Such a medium may take many forms, including, but not limited to, non-volatile media, volatile media, and transmission media. Non-volatile media include, for example, optical or magnetic disks, such as data storage device 1306. Volatile media include dynamic memory, such as memory 1306. Transmission media include coaxial cables, copper wire, and fiber optics, including the wires that comprise bus 1308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The embodiments of the present disclosure provide a system for docking one window to a predefined docking point while hiding a portion of that window when it is hidden. Similarly, the embodiments of the present disclosure provide a system for simultaneously docking a plurality of windows to at least one predefined docking point. The Embodiments of the present disclosure also provide a system for simultaneously controlling multiple windows using separate inputs, and for adjusting a window using an object in the window that has another predetermined function other than for adjusting the window.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A graphical user interface system comprising:
   a display; and
   a processor, coupled to the display, configured to display a window in an initial position;
   wherein, upon receiving at a start point from a user a window docking input comprising a dragging of the window for a portion of a distance to a predefined docking point comprising an edge of the display, the processor is configured to dock the window at the predefined docking point upon the window being dragged the portion of the distance to the predefined docking point, wherein the portion of the distance from the start point to the predefined docking point is less than an entire distance from the start point to the predefined docking point.

2. The system of claim 1, wherein the window is further configured to move towards the edge of the display upon receiving the window docking input.

3. The system of claim 2, wherein the window is configured to rotate while it moves towards the edge of the display.

4. The system of claim 1, wherein the window comprises:
   a frame portion including a title portion; and
   a content portion.

5. The system of claim 4, wherein the window docking input comprises receiving an input, from the user, within at least one of the frame portion or the content portion of the window.

6. The system of claim 4, wherein if an end point of the vector is determined to dock the window at the predefined docking point such that a portion of the title portion will not be displayed, the window is moved at the predefined docking point and docked at the predefined docking point such that the portion of the title portion is displayed on the display.

7. The system of claim 4, wherein the displayed portion of the docked window comprises the title portion of the window.

8. The system of claim 1, wherein the window is dragged along a vector towards the predefined docking point, and wherein the window is docked at the predefined docking point in a position corresponding to where the vector intersects with the predefined docking point.

9. The system of claim 1, wherein the window docking input comprises a dragging of the window for at least a predetermined velocity towards the edge of the display.

10. The system of claim 9, wherein the predetermined velocity is determined to place the window beyond the displayable portion of the edge of the display.

11. The system of claim 1, wherein at least one other docked window at the predefined docking point is configured to move away from the window after it is docked at the predefined docking point.

12. The system of claim 1, wherein the window docking input comprises a haptic input.

13. The system of claim 1, wherein, upon receiving a window undocking input by a user indicating a request to undock the window from the predefined docking point, the window is configured to return to the initial position.

14. The system of claim 1, wherein, upon receiving a window view input by a user indicating a request to view the docked window, a portion of the window is displayed from the edge of the display.

15. The system of claim 14, wherein the displaying the portion of the window comprises rotating the portion of the window in the direction of the initial position.

16. The system of claim 1, wherein the docking of the window at the predefined docking point comprises hiding a portion of the window beyond the displayable portion of the edge of the display.

17. The system of claim 1, wherein the display comprises a mobile device touchscreen display, and wherein the window docking input comprises a haptic input to the mobile device touchscreen display.

18. A method for docking a window comprising:
   displaying, on a display, a window in an initial position; and
   docking the window at the predefined docking point upon the window being dragged a portion of a distance to a predefined docking point in response to receiving, by a processor, at a start point a window docking input from a user comprising the dragging of the window for the portion of the distance to the predefined docking point comprising an edge of the display, wherein the portion of the distance from the start point to the predefined docking point is less than an entire distance from the start point to the predefined docking point.

19. The method of claim 18, further comprising moving the window towards the edge of the display in response to receiving the window docking input.

20. The method of claim 19, wherein the window is configured to rotate while it moves towards the edge of the display.

21. The method of claim 18, wherein the window comprises:
a frame portion including a title portion; and
a content portion.

22. The method of claim 21, wherein the window docking input comprises receiving an input, from the user, within at least one of the frame portion or the content portion of the window.

23. The method of claim 21, wherein if an end point of the vector is determined to dock the window at the predefined docking point such that a portion of the title portion will not be displayed, the window is moved at the predefined docking point and docked at the predefined docking point such that the portion of the title portion is displayed on the display.

24. The method of claim 21, wherein the displayed portion of the docked window comprises the title portion of the window.

25. The method of claim 18, wherein the window is dragged along a vector towards the predefined docking point, and wherein the window is docked at the predefined docking point in a position corresponding to where the vector intersects with the predefined docking point.

26. The method of claim 18, wherein the window docking input comprises a dragging of the window for at least a predetermined velocity towards the edge of the display.

27. The method of claim 26, wherein the predetermined velocity is determined to place the window beyond the displayable portion of the edge of the display.

28. The method of claim 18, further comprising moving at least one other docked window at the predefined docking point away from the window after it is docked at the predefined docking point.

29. The method of claim 18, wherein the window docking input comprises a haptic input.

30. The method of claim 18, further comprising returning the window to the initial position upon receiving a window undocking input by a user indicating a request to undock the window from the predefined docking point.

31. The method of claim 18, further comprising displaying a portion of the window from the edge of the display upon receiving a window view input by a user indicating a request to view the docked window.

32. The method of claim 31, wherein the displaying the portion of the window comprises rotating the portion of the window in the direction of the initial position.

33. The method of claim 18, wherein the docking of the window at the predefined docking point comprises hiding a portion of the window beyond the displayable portion of the edge of the display.

34. A non-transitory computer-readable medium comprising computer-readable instructions for causing a processor to execute a method comprising:
displaying, on a display, a window in an initial position;

receiving, by the processor, at a start point a window docking input from a user comprising a dragging of the window for a portion of a distance to a predefined docking point comprising an edge of the display; and docking the window at the predefined docking point upon the window being dragged the portion of the distance to the predefined docking point, wherein the portion of the distance from the start point to the predefined docking point is less than an entire distance from the start point to the predefined docking point.

35. A graphical user interface system comprising:
a display; and
a processor, coupled to the display, configured to display a plurality of windows, each comprising an initial position, wherein, upon receiving from a user an all-window docking input comprising contacting the display at a plurality of points on the display and dragging the plurality of points on the display for a portion of a distance to at least one predefined docking point comprising at least one edge of the display, the processor is configured to dock each of the plurality of windows at a corresponding position at the predefined docking point corresponding to each of the plurality of windows upon the plurality of points on the display being dragged the portion of the distance to the at least one predefined docking point, wherein the portion of the distance from the plurality of points to the at least one predefined docking point is less than an entire distance from the plurality of points to the at least one predefined docking point.

36. The system of claim 35, wherein the all-window docking input further comprises dragging the plurality of points on the display in a predetermined direction towards the predefined docking point.

37. The system of claim 35, wherein, upon receiving a window undocking input by a user indicating a request to undock each of the plurality of windows from its corresponding position on the predefined docking point, each of the plurality of windows is configured to return to its initial position.

38. The system of claim 37, wherein the window undocking input comprises a haptic input.

39. The system of claim 38, wherein the haptic input comprises contacting the display at a plurality of points on the display.

40. The system of claim 39, wherein the window undocking input further comprises dragging the plurality of points on the display for at least a predetermined distance towards the predefined docking point.

41. The system of claim 39, wherein the window undocking input further comprises dragging the plurality of points on the display in a predetermined direction towards the predefined docking point.

42. The system of claim 35, wherein the docking of each of the plurality of windows at its corresponding position on the predefined docking point corresponding to each of the plurality of windows comprises hiding a portion of each of the plurality of windows beyond the displayable portion of the at least one edge of the display.

43. A method for docking windows, comprising:
displaying a plurality of windows, each comprising an initial position;

receiving, by a processor, an all-window docking input from a user comprising contacting a display at a plurality of points on the display and dragging the plurality of points on the display for a portion of a distance to at least one predefined docking point; and docking each of the plurality of windows at a corresponding position at the predefined docking point corresponding to each of the plurality of windows upon the plurality of points on the display being dragged the portion of the distance to the at least one predefined docking point, wherein the portion of the distance from the plurality of points to the at least one predefined docking point is less than an entire distance from the plurality of points to the at least one predefined docking point.

44. The method of claim 43, wherein the all-window docking input further comprises dragging the plurality of points on the display in a predetermined direction towards the predefined docking point.

45. The method of claim 44, wherein the all-window docking input further comprises dragging the plurality of points on the display at a predetermined velocity towards the predefined docking point.

46. The method of claim 43, further comprising returning each of the plurality of windows to its initial position upon receiving a window undocking input by a user indicating a request to undock each of the plurality of windows from its corresponding position on the predefined docking point.

47. The method of claim 46, wherein the window undocking input comprises a haptic input.

48. The method of claim 47, wherein the haptic input comprises contacting the display at a plurality of points on the display.

49. The method of claim 46, wherein the window undocking input further comprises dragging the plurality of points on the display for at least a predetermined distance towards the predefined docking point.

50. The method of claim 46, wherein the window undocking input further comprises dragging the plurality of points on the display in a predetermined direction towards the predefined docking point.

51. The method of claim 43, wherein the docking of each of the plurality of windows on its corresponding position on the predefined docking point comprises hiding a portion of each of the plurality of windows beyond the displayable portion of the at least one edge of the display.

52. A non-transitory computer-readable medium comprising computer-readable instructions for causing a processor to execute a method comprising:

displaying a plurality of windows, each comprising an initial position;

receiving, by a processor, an all-window docking input from a user comprising contacting a display at a plurality of points on the display and dragging the plurality of points on the display for a portion of a distance to at least one predefined docking point; and docking each of the plurality of windows at a corresponding position at the predefined docking point corresponding to each of the plurality of windows upon the plurality of points on the display being dragged the portion of the distance to the at least one predefined docking point, wherein the portion of the distance from the plurality of points to the at least one predefined docking point is less than an entire distance from the plurality of points to the at least one predefined docking point.

\* \* \* \* \*